(12) United States Patent
Murrish et al.

(10) Patent No.: US 9,854,037 B2
(45) Date of Patent: Dec. 26, 2017

(54) IDENTIFYING WORKLOAD AND SIZING OF BUFFERS FOR THE PURPOSE OF VOLUME REPLICATION

(71) Applicant: Hitachi, Ltd., Tokyo (JP)

(72) Inventors: Randall Murrish, Seattle, WA (US); Steven Walker, Snohomish, WA (US); Oswald Luraghi, Snohomish, WA (US); Christopher Liu, Redmond, WA (US)

(73) Assignee: Hitachi, Ltd., Tokyo (JP)

( * ) Notice: Subject to any disclaimer, the term of this patent is extended or adjusted under 35 U.S.C. 154(b) by 163 days.

(21) Appl. No.: 14/770,605

(22) PCT Filed: May 13, 2013

(86) PCT No.: PCT/IB2013/001975
§ 371 (c)(1),
(2) Date: Aug. 26, 2015

(87) PCT Pub. No.: WO2014/184606
PCT Pub. Date: Nov. 20, 2014

(65) Prior Publication Data
US 2016/0014200 A1    Jan. 14, 2016

(51) Int. Cl.
*G06F 13/00* (2006.01)
*H04L 29/08* (2006.01)
(Continued)

(52) U.S. Cl.
CPC .......... *H04L 67/1095* (2013.01); *G06F 3/065* (2013.01); *G06F 3/067* (2013.01);
(Continued)

(58) Field of Classification Search
CPC ........ G06F 3/0617; G06F 3/065; G06F 3/067; G06F 9/45558; G06F 11/3442;
(Continued)

(56) References Cited

U.S. PATENT DOCUMENTS 8,478,961 B2 * 7/2013 Bozek ................. G06F 9/45558
711/118
8,966,316 B2 * 2/2015 Bennah ............... G06F 11/0793
714/38.1

(Continued)

FOREIGN PATENT DOCUMENTS

JP   2008-204358 A   9/2008
JP   2009-123055 A   6/2009
JP   2012-64012 A    3/2012

OTHER PUBLICATIONS

International Search Report of PCT/IB2013/001975.
Japanese Office Action received in corresponding Japanese Application No. 2015-559565 dated Oct. 18, 2016.

*Primary Examiner* — Kenneth R Coulter
(74) *Attorney, Agent, or Firm* — Mattingly & Malur, PC

(57) ABSTRACT

A controller is operable to: identify virtual machines to be protected in a first storage system; identify logical volumes used by the virtual machines based on first relationship information; calculate workload, based on information of workload monitored for the identified logical volumes; and calculate size of a buffer area in the first storage system to be used for temporarily storing copy data to be sent to a second storage system in remote copy procedure of one or more remote copy pairs, based on the calculated workload, each copy pair being formed by a logical volume of the identified logical volumes in the first storage system as primary logical volume and another logical volume in the second storage system as secondary logical volume, so that the buffer area having a size equal to or greater than the calculated size can be used to manage protection of the identified virtual machines.

20 Claims, 47 Drawing Sheets

(51) Int. Cl.
*G06F 3/06* (2006.01)
*G06F 9/455* (2006.01)
*H04L 12/26* (2006.01)
*G06F 11/20* (2006.01)
*G06F 11/30* (2006.01)
*G06F 11/34* (2006.01)

(52) U.S. Cl.
CPC ........ *G06F 3/0617* (2013.01); *G06F 9/45558* (2013.01); *G06F 11/3442* (2013.01); *H04L 43/04* (2013.01); *G06F 11/2071* (2013.01); *G06F 11/3034* (2013.01); *G06F 11/3433* (2013.01); *G06F 2009/45579* (2013.01); *G06F 2009/45583* (2013.01)

(58) Field of Classification Search
CPC ....... G06F 11/2071; G06F 2009/45583; G06F 11/3034; G06F 2009/45579; G06F 11/3433; H04L 43/04; H04L 67/1095
USPC .................................. 709/217–219, 212–216
See application file for complete search history.

(56) References Cited

U.S. PATENT DOCUMENTS

| | | | |
|---|---|---|---|
| 9,135,141 B2* | 9/2015 | Bennah | G06F 11/3604 |
| 9,606,728 B2* | 3/2017 | Bolik | G06F 3/0604 |
| 9,626,105 B2* | 4/2017 | Bolik | G06F 3/0604 |
| 2008/0208932 A1 | 8/2008 | Tsuge et al. | |
| 2009/0132779 A1 | 5/2009 | Amaki et al. | |
| 2011/0087850 A1 | 4/2011 | Kawada | |
| 2012/0072687 A1 | 3/2012 | Hiraiwa | |
| 2012/0226866 A1* | 9/2012 | Bozek | G06F 9/45558 711/122 |
| 2013/0151774 A1* | 6/2013 | Bolik | G06F 3/0604 711/118 |
| 2013/0185506 A1* | 7/2013 | Bolik | G06F 3/0604 711/114 |
| 2014/0157056 A1* | 6/2014 | Bennah | G06F 11/3604 714/37 |

* cited by examiner

MEMORY

| VM AND VOLUME IDENTIFICATION MODULE | REPLICATION BUFFER SIZE CALCULATION MODULE | REPLICATION BUFFER CREATION MODULE | VM PROTECTION FLAG TABLE |
|---|---|---|---|
| VM TO VOLUME MAPPING TABLE FOR THE CREATION OF A NEW REPLICATION BUFFER | LOGICAL VOLUME REPLICATION LIST TABLE FOR THE CREATION OF A NEW REPLICATION BUFFER | VM TO VOLUME MAPPING TABLE FOR THE MODIFICATION OF AN EXISTING REPLICATION BUFFER | LOGICAL VOLUME REPLICATION LIST TABLE FOR THE MODIFICATION OF AN EXISTING REPLICATION BUFFER |
| CALCULATED WORKLOAD VALUE | CALCULATED REPLICATION BUFFER MINIMUM SIZE VALUE | TABLE OF UNUSED LOCAL DISK GROUPS | TABLE OF UNUSED REMOTE DISK GROUPS |
| TABLE OF LOCAL DISK GROUPS IN EXISTING REPLICATION BUFFER | TABLE OF REMOTE DISK GROUPS IN EXISTING REPLICATION BUFFER | REMOTE DISK GROUPS TABLE | LOCAL DISK GROUPS TABLE |
| REMOTE DISK GROUPS TABLE WITH MEETS THROUGHPUT FLAG COLUMN AND MEETS SIZE FLAG COLUMN | LOCAL DISK GROUPS TABLE WITH MEETS THROUGHPUT FLAG COLUMN AND MEETS SIZE FLAG COLUMN | TABLE OF REMOTE DISK GROUPS THAT MEET THE CRITERIA FOR REPLICATION BUFFER | TABLE OF LOCAL DISK GROUPS THAT MEET THE CRITERIA FOR REPLICATION BUFFER |
| TABLE OF REMOTE DISK GROUPS FOR BUFFER AS OUTPUT OF SUBORDINATE PROCESS TO CALCULATE REQUIRED DISK GROUPS | TABLE OF LOCAL DISK GROUPS FOR BUFFER AS OUTPUT OF SUBORDINATE PROCESS TO CALCULATE REQUIRED DISK GROUPS | TABLE OF REMOTE DISK GROUPS FOR BUFFER AS OUTPUT OF SUBORDINATE PROCESS TO CALCULATE REQUIRED MODIFIED DISK GROUPS | TABLE OF LOCAL DISK GROUPS FOR BUFFER AS OUTPUT OF SUBORDINATE PROCESS TO CALCULATE REQUIRED MODIFIED DISK GROUPS |
| LOCAL TO REMOTE VOLUME MAPPING TABLE | LOCAL TO REMOTE VOLUME AND REPLICATION BUFFER MAPPING TABLE | VM TO NEW LOGICAL VOLUME MAPPING TABLE FOR THE CREATION OF A NEW REPLICATION BUFFER | VM TO NEW LOGICAL VOLUME MAPPING TABLE FOR THE MODIFICATION OF AN EXISTING REPLICATION BUFFER |

FIG. 2

| Virtual machine list | Virtual Volume | Logical Volume |
|---|---|---|
| VM1 | VV1, VV2 | LV:01:01 |
| VM2 | VV3 | LV:01:01 |
| VM3 | VV4 | LV:22:02 |
| VM4 | VV5 | LV:22:02 |
| VM5 | VV6 | LV:00:03 |

FIG. 6

| Logical volumes to protect |
|---|
| LV:01:01 |
| LV:22:02 |
| LV:00:03 |

FIG. 7

| Virtual machine list | Protect flag |
|---|---|
| VM1 | true |
| VM2 | true |
| VM3 | true |
| VM4 | true |
| VM5 | false |
| VM6 | true |

FIG. 9

| Virtual machine list | Virtual Volume | Logical Volume |
|---|---|---|
| VM1 | VV1, VV2 | LV:01:01 |
| VM2 | VV3 | LV:01:01 |
| VM3 | VV4 | LV:22:02 |
| VM4 | VV5 | LV:22:02 |
| VM6 | VV7 | LV:00:08 |

FIG. 11

| Logical volumes to protect |
|---|
| LV:01:01 |
| LV:22:02 |
| LV:00:08 |

FIG. 12

Peak workload – highest workload system experiences
Typical workload – highest workload that can be expected during normal operations
Average workload – Average workload over system lifetime

| Workload MB/s |
|---|
| 181 |

| Replication Buffer Minimum Size (GB) |
|---|
| 427 |

FIG. 17

| Disk group name | Layout/size | Throughput (MB/s) |
|---|---|---|
| DG10 | 7d+1/300GB | 95 |
| DG11 | 7d+1/300GB | 95 |
| DG12 | 7d+1/300GB | 95 |
| DG13 | 7d+1/300GB | 95 |
| DG14 | 7d+1/500GB | 95 |
| DG15 | 3d+1/500GB | 65 |
| DG16 | 3d+1/500GB | 65 |
| DG17 | 3d+1/500GB | 65 |
| DG18 | 3d+1/500GB | 65 |
| DG19 | 5d+2/500GB | 51 |
| DG40 | 5d+2/500GB | 51 |
| DG41 | 5d+2/500GB | 51 |
| DG42 | 5d+2/500GB | 51 |

FIG. 19

| Disk group name | Layout/size | Throughput (MB/s) |
|---|---|---|
| DG20 | 3d+1/500GB | 65 |
| DG21 | 5d+1/300GB | 80 |
| DG22 | 7d+2/500GB | 60 |
| DG23 | 5d+1/300GB | 80 |
| DG24 | 7d+2/500GB | 60 |
| DG25 | 5d+1/300GB | 80 |
| DG26 | 7d+2/500GB | 60 |
| DG27 | 5d+1/300GB | 80 |
| DG28 | 3d+1/500GB | 65 |
| DG29 | 5d+1/300GB | 80 |
| DG30 | 3d+1/500GB | 65 |
| DG31 | 3d+2/600GB | 41 |

FIG. 20

| Virtual machine list | Protect flag | Virtual Volume | Logical Volume (1) | Disk group | Host | New Logical Volume (2) |
|---|---|---|---|---|---|---|
| VM1 | true | VV1, VV2 | LV:01:01 | DG01 | Server1 | LV:80:08 |
| VM2 | true | VV3 | LV:01:01 | DG01 | Server1 | LV:80:08 |
| VM3 | true | VV4 | LV:22:02 | DG01 | Server2 | LV:80:08 |
| VM4 | true | VV5 | LV:22:02 | DG01 | Server2 | LV:80:08 |
| VM5 | false | VV6 | LV:00:03 | DG02 | Server2 | LV:09:99 (3) |
| VM6 | true | VV7 | LV:00:03 | DG02 | Server 2 | LV:09:99 |

FIG. 21

| Logical volumes to protect |
|---|
| LV:80:08 |
| LV:09:99 |

FIG. 22

| Disk group name | Layout/size | Throughput (MB/s) |
|---|---|---|
| DG12 | 7d+1/300GB | 95 |
| DG13 | 7d+1/300GB | 95 |

FIG. 24

| Disk group name | Layout/size | Throughput (MB/s) |
|---|---|---|
| DG21 | 5d+1/300GB | 80 |
| DG23 | 5d+1/300GB | 80 |
| DG25 | 5d+1/300GB | 80 |

FIG. 25

| Layout/disk size | List of disk groups | Throughput |
|---|---|---|
| 5d+1/300GB | DG21, DG23, DG25, DG27, DG29 | 80 |
| 7d+2/500GB | DG22, DG24, DG26 | 60 |
| 3d+1/500GB | DG20, DG28, DG30 | 65 |
| 3d+2/600GB | DG31 | 41 |

FIG. 29

| Layout/disk size | List of disk groups | Throughput |
|---|---|---|
| 7d+1/300GB | DG10, DG11, DG12, DG13, DG14 | 95 |
| 3d+1/500GB | DG15, DG16, DG17, DG18 | 65 |
| 5d+2/500GB | DG19, DG40, DG41, DG42 | 51 |

FIG. 29A

| Layout/disk size | List of disk groups | Throughput | Meets throughput | Meets size |
|---|---|---|---|---|
| 5d+1/300GB | DG21, DG23, DG25, DG27, DG29 | 80 | Yes | Yes |
| 7d+2/500GB | DG22, DG24, DG26 | 60 | | |
| 3d+1/500GB | DG20, DG28, DG30 | 65 | Yes | Yes |
| 3d+2/600GB | DG31 | 41 | | |

FIG. 30

| Layout/disk size | List of disk groups | Throughput | Meets throughput | Meets size |
|---|---|---|---|---|
| 7d+1/300GB | DG10, DG11, DG12, DG13, DG14 | 95 | Yes | Yes |
| 3d+1/500GB | DG15, DG16, DG17, DG18 | 65 | | |
| 5d+2/500GB | DG19, DG40, DG41, DG42 | 51 | | |

FIG. 30A

| Layout/disk size | List of disk groups | Throughput | Meets throughput | Meets size |
|---|---|---|---|---|
| 5d+1/300GB | DG21, DG23, DG25, DG27, DG29 | 80 | Yes | Yes |
| 3d+1/500GB | DG20, DG28, DG30 | 65 | Yes | Yes |

FIG. 31

| Layout/disk size | List of disk groups | Throughput | Meets throughput | Meets size |
|---|---|---|---|---|
| 7d+1/300GB | DG10, DG11, DG12, DG13, DG14 | 95 | Yes | Yes |

FIG. 31A

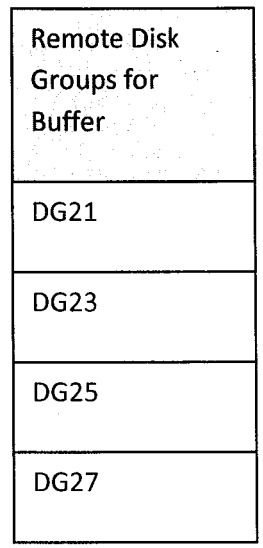
FIG. 35
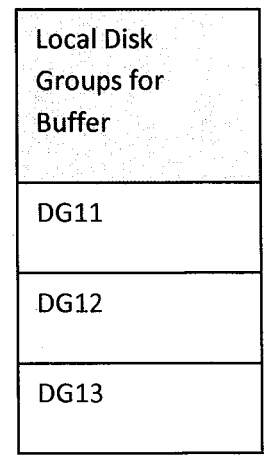
FIG. 35-A

| Local Logical Volume | Remote Logical Volume |
|---|---|
| 01:01:01 | 02:03:02 |
| 01:02:A1 | 03:22:14 |
| 02:03:23 | 05:17:23 |

FIG. 39

| Local Logical Volume | Local replication buffer | Remote replication buffer | Remote Logical Volume |
|---|---|---|---|
| 01:01:01 | 07:01:01 | 03:03:03 | 02:03:02 |
| 01:02:A1 | 07:01:01 | 03:03:03 | 03:22:14 |
| 02:03:23 | 07:01:01 | 03:03:03 | 05:17:23 |

FIG. 40

| Virtual machine list | Virtual Volume | Logical Volume | Disk group | Host | New Logical Volume |
|---|---|---|---|---|---|
| VM1 | VV1, VV2 | LV:01:01 | DG01 | Server1 | LV:80:08 |
| VM2 | VV3 | LV:01:01 | DG01 | Server1 | LV:80:08 |
| VM3 | VV4 | LV:22:02 | DG01 | Server2 | LV:80:08 |
| VM4 | VV5 | LV:22:02 | DG01 | Server2 | LV:80:08 |
| VM5 | VV6 | LV:00:03 | DG02 | Server2 | LV:09:99 |

| Logical volumes to protect |
|---|
| LV:80:08 |
| LV:09:99 |

IDENTIFYING WORKLOAD AND SIZING OF BUFFERS FOR THE PURPOSE OF VOLUME REPLICATION

BACKGROUND OF THE INVENTION

The present invention relates generally to data replication and, more particularly, to efficient volume replication by automatically identifying workload and sizing replication buffers.

Replication of volumes in a virtualized datacenter environment for the purpose of data replication is a complex and error prone process. It requires exhaustive knowledge of the storage array technology as well as complex calculations to size the replication buffer required to replicate the virtualized environment. The user is required to manually map the virtualized environment to the physical storage array environment to determine the volumes that require replication. Once the volumes are identified, complex calculations are required with volume specific metrics to size the replication buffer required to adequately replicate the work load to a remote site. Once the required replication buffer size is calculated, the replication buffer is created and is associated with paired volumes to initiate replication.

BRIEF SUMMARY OF THE INVENTION

Exemplary embodiments of the invention provide automatic identification, calculation, configuration, and creation of replication from one virtualized datacenter to another virtualized datacenter. The automated process is broken in to three distinct phases that include:

1. Identification and mapping of virtual machines to physical volumes;
2. Calculation of required replication buffer size to meet replication requirements; and
3. Creation and recording of the association between the replication buffer and volume replication and between the local and remote virtual datacenters.

Each phase is broken in to separate sub-processes that deal with either the creation process of a new replication buffer or the modification process of an existing replication buffer.

Two embodiments are described. They differ only in the identification phase. The first embodiment retains the existing physical volume configuration defined by the user. The second embodiment provides additional identification and configuration steps to narrow the scope of replicated volumes to only those that are selected. Data is migrated to new combined volumes with like performance and only those volumes are included in the replication configuration, thus reducing the replication load between virtual datacenters.

The system that performs the automated process has the ability to inventory both the virtual and physical environments found in the virtual datacenter and map the virtual resources such as data stores to physical resources such as logical volumes. This inventory and mapping capability allows the system to perform the necessary creation and migration of virtual and physical resources outlined in the detailed description. This invention can be used to identify volumes requiring replication, calculate the replication buffer size required to handle the replicated load, and create the replication buffer.

In accordance with an aspect of the present invention, a computer comprises a memory and a controller. The controller is operable to: identify one or more virtual machines of a plurality of virtual machines to be protected in a first storage system; identify one or more logical volumes of a plurality of logical volumes in the first storage system, the one or more logical volumes used by the identified one or more virtual machines, based on first relationship information between the plurality of virtual machines and the plurality of logical volumes, the first relationship information being managed by the controller; calculate a workload to be used for the identified one or more logical volumes, based on information of workload monitored for each of the identified one or more logical volumes, the information of workload monitored being managed by the controller; and calculate a size of a buffer area in the first storage system to be used for temporarily storing copy data to be sent from the first storage system to a second storage system in a remote copy procedure of one or more remote copy pairs, based on the calculated workload of the identified one or more logical volumes, each of the one or more remote copy pairs being formed by a logical volume of the identified one or more logical volumes in the first storage system as a primary logical volume and another logical volume in the second storage system as a secondary logical volume, so that the buffer area for the remote copy procedure of the identified one or more logical volumes having a size equal to or greater than the calculated size can be used to manage protection of the identified one or more virtual machines.

In some embodiments, the controller is operable to (i) create a new buffer area in the first storage system based on the calculated workload and the calculated size of the buffer area or (ii) modify an existing buffer area in the first storage system based on the calculated workload and the calculated size of the buffer area. The controller is operable to (i) create a new buffer area in the second storage system based on the calculated workload and the calculated size of the buffer area or (ii) modify an existing buffer area in the second storage system based on the calculated workload and the calculated size of the buffer area. The first storage system has an overhead and an outage duration. The size of the buffer area is calculated as the calculated workload multiplied by the outage duration multiplied by (1+overhead).

In specific embodiments, the first storage system has a plurality of disk groups including used disk groups and unused disk groups. Each unused disk group has a disk group layout with a disk group size and a disk group throughput. The controller is operable to select, from the unused disk groups, one or more disk groups to be used by the buffer area in the first storage system, the selecting one or more disk groups comprising: organizing the unused disk groups by disk group layout; identifying, for each disk group layout, a list of candidate disk groups which have a total disk group throughput that is greater than the calculated workload and which have a total disk group size that is greater than the calculated size of the buffer area, so as to produce one or more lists of candidate disk groups; selecting, from the identified one or more lists of candidate disk groups, the list of candidate disk groups having the highest total disk group throughput; and determining a number of disk groups required, in the selected list of candidate disk groups, for the buffer area by (i) dividing the calculated workload by the total disk group throughput for the selected list and rounding up to the nearest whole number to obtain a first calculated value, (ii) dividing the calculated size of the buffer area by the disk group size of the selected list and rounding up to the nearest whole number to obtain a second calculated value, and (iii) selecting a maximum of the first calculated value and the second calculated value as the number of disk groups required in the selected list of candidate disk groups for the buffer area.

In some embodiments, the calculated size of the buffer area is for modifying an existing buffer area which has a list of existing one or more virtual machines to protect. The controller is operable to identify, from the list of existing one or more virtual machines, which of the existing one or more virtual machines will retain protection; and identify any one or more virtual machines to be newly protected. The one or more logical volumes are identified which are used by the identified one or more virtual machines to retain protection and the identified one or more virtual machines to be newly protected. The first storage system has a plurality of disk groups. The calculated size of the buffer area is for selecting an existing buffer area which has a size that is greater than the calculated size of the buffer area and which has a total throughput that is greater than the calculated workload, the total throughput of the existing buffer area being equal to a product of a disk group throughput of one or more disk groups allocated to the existing buffer area and a number of the one or more disk groups allocated to the existing buffer area.

In specific embodiments, the first storage system has a plurality of disk groups including used disk groups and unused disk groups. The calculated size of the buffer area is for modifying an existing buffer area (i) which has a size that is not greater than the calculated size of the buffer area or (ii) which has a total throughput that is not greater than the calculated workload, the total throughput of the existing buffer area being equal to a product of a disk group throughput of one or more existing disk groups allocated to the existing buffer area and a number of the one or more existing disk groups allocated to the existing buffer area. The controller is operable to select, from the unused disk groups, one or more disk groups to be added to the existing buffer area in the first storage system.

In some embodiments, each unused disk group has a disk group layout with a disk group size and a disk group throughput. The one or more existing disk groups in the existing buffer area have an existing disk group layout. Selecting one or more disk groups to be added to the existing buffer area in the first storage system comprises: organizing the unused disk groups by disk group layout; identifying, from the unused disk groups which have a same disk group layout as the existing disk group layout, a list of candidate disk groups which, when added to the existing disk groups, have a total disk group throughput that is greater than the calculated workload and which have a total disk group size that is greater than the calculated size of the buffer area; and determining a number of disk groups required, in the identified list of candidate disk groups, to be added to the existing buffer area by (i) dividing the calculated workload by the total disk group throughput for the identified list when added to the existing disk groups and rounding up to the nearest whole number to obtain a first calculated value, (ii) dividing the calculated size of the buffer area by the disk group size of the identified list when added to the existing disk groups and rounding up to the nearest whole number to obtain a second calculated value, and (iii) selecting a maximum of the first calculated value and the second calculated value as the number of disk groups required in the identified list of candidate disk groups to be added the existing buffer area.

In specific embodiments, the first storage system has a plurality of disk groups. A plurality of logical volumes are identified in the first storage system based on first relationship information. The controller is operable to: identify disk groups that contain the identified logical volumes in the first storage system; calculating a total amount of space to provision for each of the identified disk groups to contain all data of the identified logical volumes in the first storage system; creating a single logical volume based on the calculated total amount of space to provision for each of the identified disk groups; and calculating the workload and the size of the buffer area using the created single logical volume instead of the identified logical volumes.

In some embodiments, the controller is operable to: create a buffer area in the first storage system based on the calculated workload and the calculated size of the buffer area; update the first relationship between the plurality of virtual machines and the plurality of logical volumes; identify one or more new virtual machines of the plurality of virtual machines to be protected in the first storage system, the one or more new virtual machines being different from the previously identified one or more virtual machines to be protected; identify a plurality of new logical volumes of the plurality of logical volumes in the first storage system, the one or more logical volumes used by the identified one or more new virtual machines, based on the first relationship information between the plurality of virtual machines and the plurality of logical volumes; identify disk groups that contain the identified new logical volumes in the first storage system; calculate a total amount of new space to provision for each of the identified disk groups to contain all data of the identified new logical volumes in the first storage system; create a new single logical volume based on the calculated total amount of new space to provision for each of the identified disk groups, by modifying the previously created single logical volume which includes removing any virtual machines that need to be unprotected and adding any virtual machines that need to be newly protected, based on the identified one or more new virtual machines to be protected; calculate a new workload to be used for the new single logical volume, based on information of workload monitored for the new single logical volume; calculate a new size of a new buffer area in the first storage system to be used for temporarily storing copy data to be sent from the first storage system to the second storage system in a remote copy procedure of one or more remote copy pairs, based on the calculated new workload of the new single logical volume, so that the new buffer area for the remote copy procedure of the new single logical volume having a size equal to or greater than the calculated new size can be used to manage protection of the identified one or more new virtual machines; and modify the previously created buffer area to create the new buffer area based on the calculated new workload and the calculated new size of the new buffer area.

Another aspect of the invention is directed to a system comprising a first storage system, a second storage system, and a management computer. The management computer has a memory and a controller. The controller being operable to: identify one or more virtual machines of a plurality of virtual machines to be protected in the first storage system; identify one or more logical volumes of a plurality of logical volumes in the first storage system, the one or more logical volumes used by the identified one or more virtual machines, based on first relationship information between the plurality of virtual machines and the plurality of logical volumes, the first relationship information being managed by the controller; calculate a workload to be used for the identified one or more logical volumes, based on information of workload monitored for each of the identified one or more logical volumes, the information of workload monitored being managed by the controller; and calculate a size of a buffer area in the first storage system to be used for temporarily storing copy data to be sent from the first storage system to the second storage system in a remote copy procedure of one or more remote copy pairs, based on the calculated workload of the identified one or more logical volumes, each of the one or more remote copy pairs being formed by a logical volume of the identified one or more logical volumes in the first storage system as a primary logical volume and another logical volume in the second storage system as a secondary logical volume, so that the buffer area for the remote copy procedure of the identified one or more logical volumes having a size equal to or greater than the calculated size can be used to manage protection of the identified one or more virtual machines.

Another aspect of this invention is directed to a computer-readable storage medium storing a plurality of instructions for controlling a data processor to management replication. The plurality of instructions comprise: instructions that cause the data processor to identify one or more virtual machines of a plurality of virtual machines to be protected in a first storage system; instructions that cause the data processor to identify one or more logical volumes of a plurality of logical volumes in the first storage system, the one or more logical volumes used by the identified one or more virtual machines, based on first relationship information between the plurality of virtual machines and the plurality of logical volumes, the first relationship information being managed by the controller; instructions that cause the data processor to calculate a workload to be used for the identified one or more logical volumes, based on information of workload monitored for each of the identified one or more logical volumes, the information of workload monitored being managed by the controller; and instructions that cause the data processor to calculate a size of a buffer area in the first storage system to be used for temporarily storing copy data to be sent from the first storage system to a second storage system in a remote copy procedure of one or more remote copy pairs, based on the calculated workload of the identified one or more logical volumes, each of the one or more remote copy pairs being formed by a logical volume of the identified one or more logical volumes in the first storage system as a primary logical volume and another logical volume in the second storage system as a secondary logical volume, so that the buffer area for the remote copy procedure of the identified one or more logical volumes having a size equal to or greater than the calculated size can be used to manage protection of the identified one or more virtual machines.

These and other features and advantages of the present invention will become apparent to those of ordinary skill in the art in view of the following detailed description of the specific embodiments.

BRIEF DESCRIPTION OF THE DRAWINGS

FIG. 2 illustrates an example of a memory in the management computer of FIG. 1.

FIG. 6 shows an example of a VM to volume mapping table for the creation of a new replication buffer.

FIG. 7 shows an example of a logical volume replication list table for the creation of a new replication buffer according to the first embodiment.

FIG. 9 shows an example of a VM protection flag table.

FIG. 11 shows an example of a VM to volume mapping table for the modification of an existing replication buffer.

FIG. 12 shows an example of a logical volume replication list table for the modification of an existing replication buffer according to the first embodiment.

FIG. 17 shows an example of a calculated replication buffer minimum size value.

FIG. 19 shows an example of a table of unused local disk groups (local site).

FIG. 20 shows an example of a table of unused remote disk groups (remote site).

FIG. 21 shows an example of a VM to new logical volume mapping table for the modification of an existing replication buffer according to the second embodiment.

FIG. 22 shows an example of a logical volume replication list table for the modification of an existing replication buffer according to the second embodiment.

FIG. 24 shows an example of a table of local disk groups in the existing replication buffer.

FIG. 25 shows an example of a table of remote disk groups in the existing replication buffer.

FIG. 29 shows an example of a remote disk groups table.

FIG. 29A shows an example of a local disk groups table.

FIG. 30 shows an example of a remote disk groups table with a meets throughput flag column and a meets size flag column after a completed pass through of the steps to calculate required disk groups.

FIG. 30A shows an example of a local disk groups table with a meets throughput flag column and a meets size flag column after a completed pass through of the steps to calculate required disk groups.

FIG. 31 shows an example of a table of remote disk groups that meet the criteria for the replication buffer.

FIG. 31A shows an example of a table of local disk groups that meet the criteria for the replication buffer.

FIG. 35 is an example of a table of remote disk groups for replication buffer as the output of the subordinate process to calculate required modified disk groups of FIGS. 33 and 34.

FIG. 35A is an example of a table of local disk groups for replication buffer as the output of the subordinate process to calculate required modified disk groups of FIGS. 33 and 34.

FIG. 39 shows an example of a local to remote volume mapping table.

FIG. 40 shows an example of a local to remote volume and replication buffer mapping table.

DETAILED DESCRIPTION OF THE INVENTION

Figure 1:
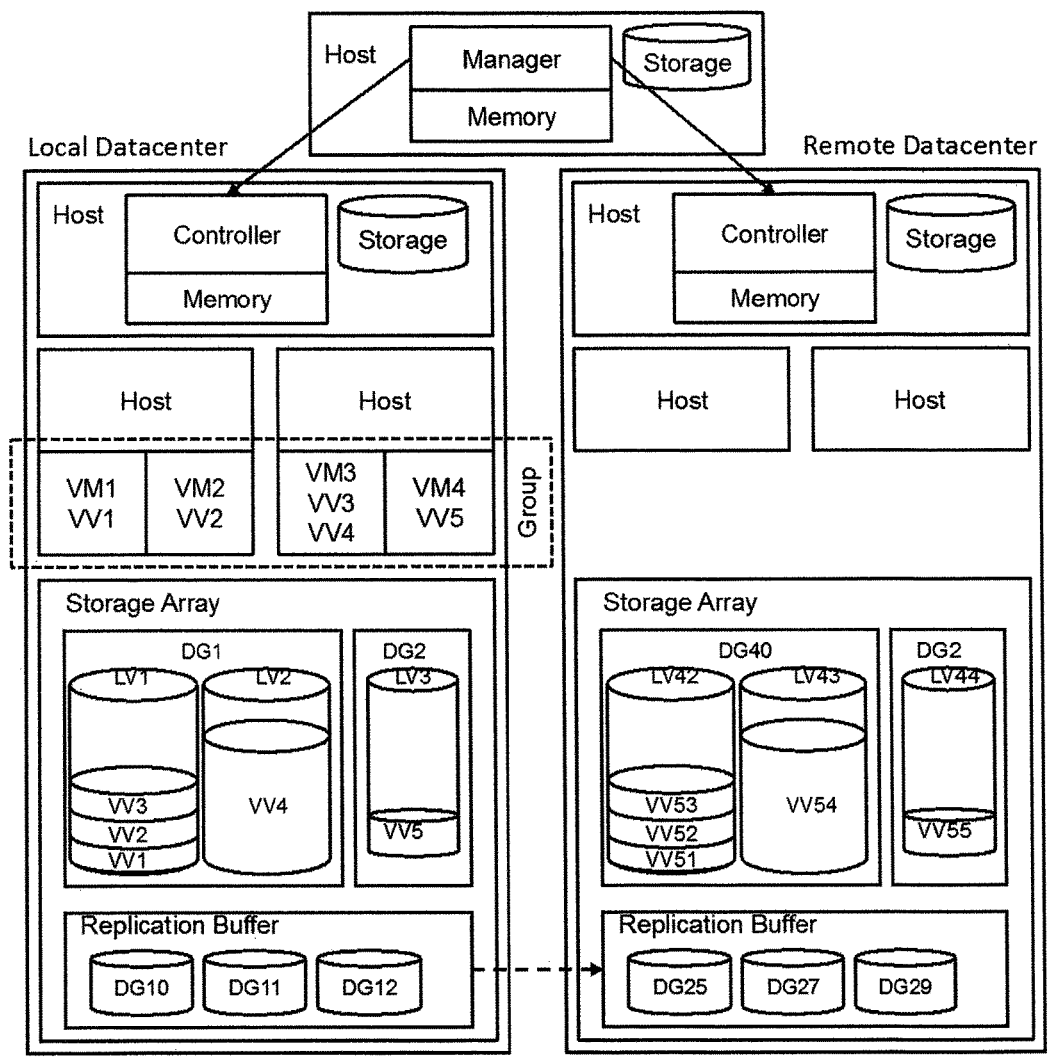
FIG. 1 illustrates an example of a hardware configuration of a system in which the method and apparatus of the invention may be applied according to a first embodiment of the invention.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for efficient volume replication by automatically identifying workload and sizing replication buffers.

I. Embodiment 1

The first embodiment shows identification of a set of existing volumes to replicate to a remote location from a local site, the calculation of the replication buffer required for the set of volumes, and establishing the relationship between the selected volumes and the replication buffer. The first embodiment is separated into three phases: identification of volumes, calculation of replication buffer size, and creation of the replication relationship between the selected volumes and the replication buffer. Each phase is divided into separate operations based on the creation or modification of a replication buffer.

FIG. 1 illustrates an example of a hardware configuration of a system in which the method and apparatus of the invention may be applied. FIG. 1 shows a local datacenter at a local site and a remote datacenter at a remote site. Each datacenter has host computers and a storage subsystem. Each host computer has a controller, a memory, and storage. The local datacenter further includes a group of virtual machines (VMs) and virtual volumes (VVs) from two host computers. In general, there may be multiple groups in a datacenter. Each storage subsystem includes a storage array and a replication buffer, which store disk groups (DGs) each having one or more logical volumes (LVs) with corresponding virtual volumes (VVs). The storage subsystem provides a plurality of logical volumes as storage areas for the host computers. The host computers use the identifiers of these logical volumes to read data from or write data to the storage subsystem. The identifiers of the logical volumes are referred to as Logical Unit Number (LUN). The logical volume may be included in a single physical storage device or a plurality of storage devices. Similarly, a plurality of logical volumes may be associated with a single physical storage device. Additional components such as storage controllers, memories, storage disks, and interfaces are omitted.

In FIG. 1, a management computer external to the local and remote datacenters controls the automated process for efficient volume replication. The management computer (as a host computer) includes a manager (management controller), a memory, and storage. The local storage of the management computer stores management data including charts that are stored between phases of the process The storage also retains a copy of the in memory charts for recovery purposes and on reboot. A local controller of the manager is responsible for integration between the manager process and the local hypervisor environment. The controller is also responsible for interrogating the storage array when requesting inventorying information as well as commanding the storage array to create, modify, or delete the various objects needed to identify, calculate, and establish replication.

In alternative embodiments, the management functions of the management computer may be performed by one of the datacenters (typically the local datacenter) and the external management computer may be omitted.

FIG. 2 illustrates an example of a memory in the management computer of FIG. 1. The memory stores a VM and volume identification module, a replication buffer size calculation module, a replication buffer creation module, a VM to volume mapping table for the creation of a new replication buffer (FIG. 6), a logical volume replication list table for the creation of a new replication buffer (FIG. 7 or FIG. 51), a VM protection flag table (FIG. 9), a VM to volume mapping table for the modification of an existing replication buffer (FIG. 11), a logical volume replication list table for the modification of an existing replication buffer (FIG. 12 or FIG. 22), a calculated workload value (FIG. 15), a calculated replication buffer minimum size value (FIG. 17), a table of unused local disk groups (FIG. 19), a table of unused remote disk groups (FIG. 20), a table of local disk groups in the existing replication buffer (FIG. 24), a table of remote disk groups in the existing replication buffer (FIG. 25), a remote disk groups table (FIG. 29), a local disk groups table (FIG. 29A), a remote disk groups table with a meets throughput flag column and a meets size flag column (FIG. 30), a local disk groups table with a meets throughput flag column and a meets size flag column (FIG. 30A), a table of remote disk groups that meet the criteria for the replication buffer (FIG. 31), a table of local disk groups that meet the criteria for the replication buffer (FIG. 31A), a table of remote disk groups for buffer as the output of the subordinate process to calculate required disk groups (FIG. 32), a table of local disk groups for buffer as the output of the subordinate process to calculate required disk groups (FIG. 32A), a table of remote disk groups for buffer as the output of the subordinate process to calculate required modified disk groups (FIG. 35), a table of local disk groups for buffer as the output of the subordinate process to calculate required modified disk groups (FIG. 35A), a local to remote volume mapping table (FIG. 39), a local to remote volume and replication buffer mapping table (FIG. 40), a VM to new logical volume mapping table for the creation of a new replication buffer (FIG. 50), a VM to new logical volume mapping table for the modification of an existing replication buffer (FIG. 21).

I.A Phase 1: Identification

The virtual machine and physical volume identification process of Phase 1 is performed by the VM and volume identification module (e.g., program).

I.A.1 Creation of a New Replication Buffer

Figure 3:
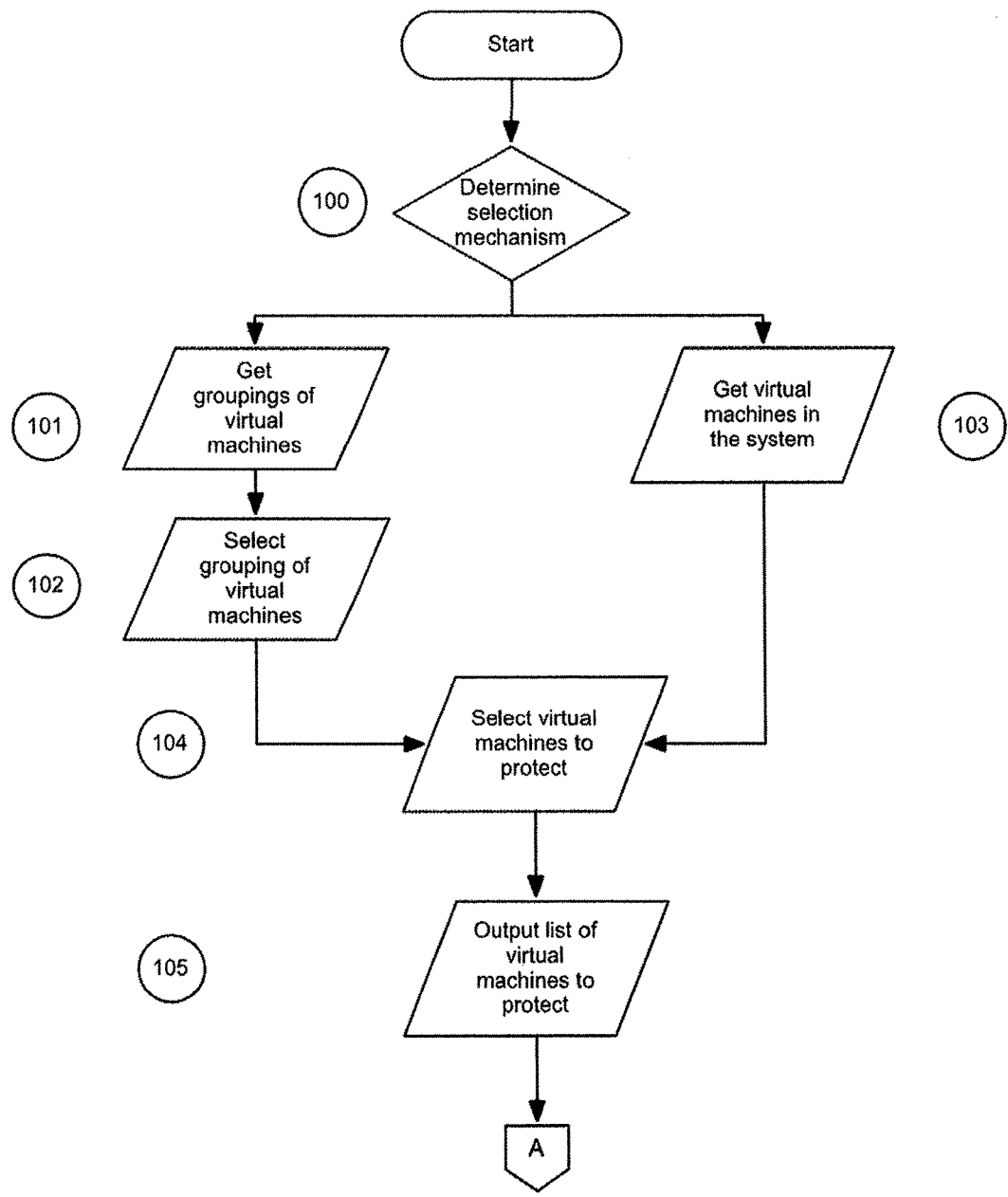
FIG. 3 shows an example of a flow diagram illustrating a process for identifying virtual machines to protect in the creation of a new replication buffer according to the first embodiment of the invention.
Figure 4:
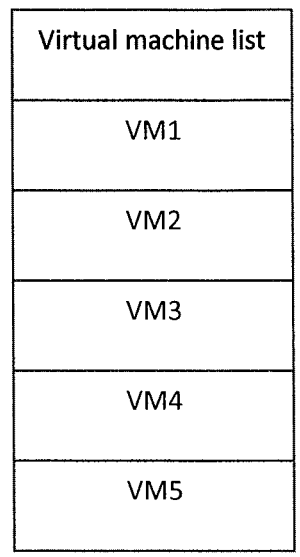
FIG. 4 shows an example of a VM (virtual machine) replication list table.

FIG. 3 shows an example of a flow diagram illustrating a process for identifying virtual machines to protect in the creation of a new replication buffer according to the first embodiment of the invention. The process presents a choice of two selection mechanisms selected by a user in Step 100. According to one selection mechanism, Step 101 gathers a list of virtual machine (VM) groupings through the hypervisor while a selection of which grouping to use for replication is made in Step 102. The selected grouping of virtual machines is presented to the user in Step 104. According to another selection mechanism, Step 103 gathers a list of all virtual machines through the hypervisor and presents that list to the user in Step 104. In Step 104, the user can select the virtual machines to replicate/protect, either from the grouping selected in Step 102 or from the list obtained in Step 103. In Step 105, the program will create a VM replication list table shown in FIG. 4 that lists the virtual machines that should be replicated.

Figure 5:
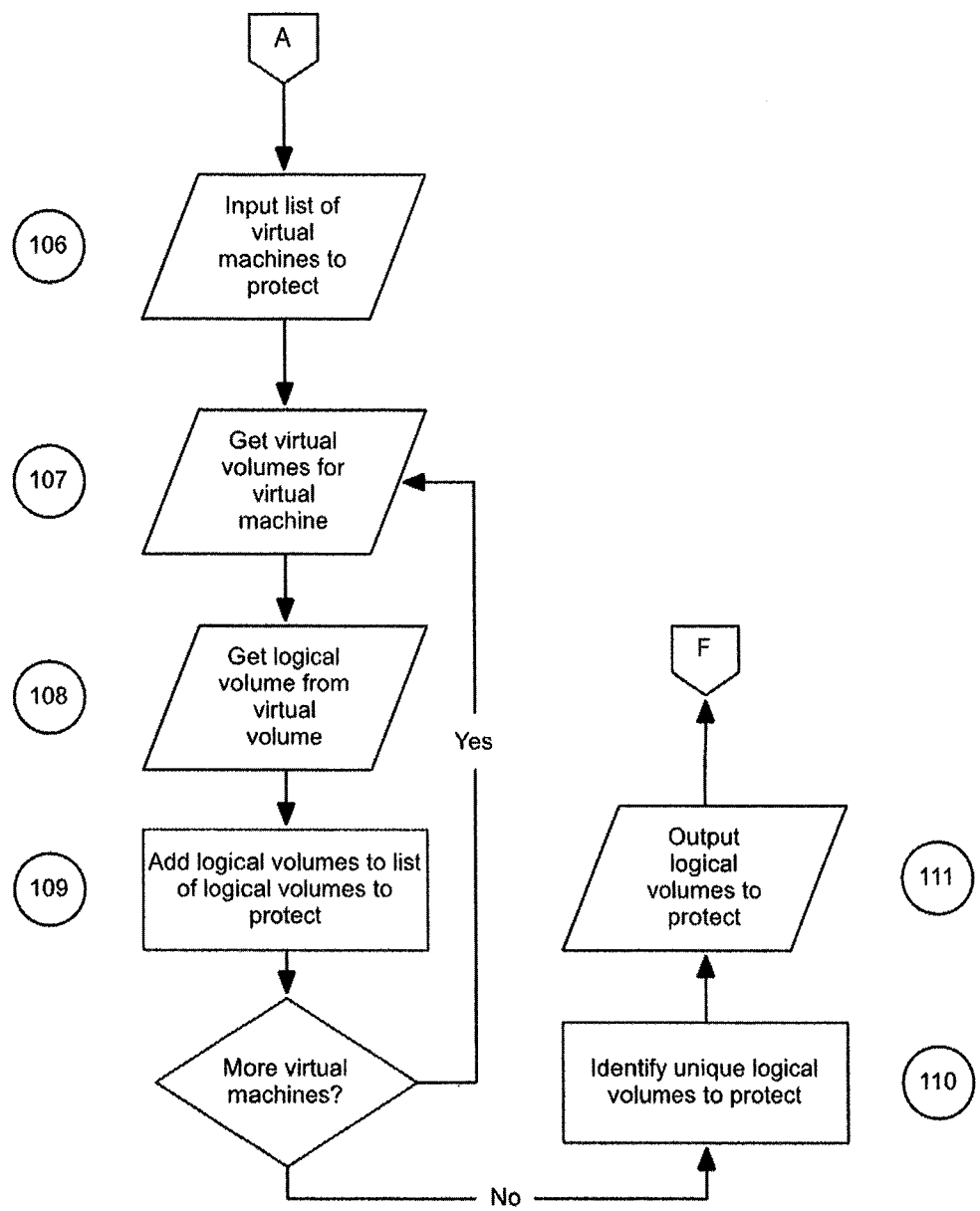
FIG. 5 shows an example of a flow diagram illustrating a process for identifying logical volumes to protect based on the virtual machines identified in the process of FIG. 3 according to the first embodiment.

FIG. 5 shows an example of a flow diagram illustrating a process for identifying logical volumes to protect based on the virtual machines identified in the process of FIG. 3 according to the first embodiment. In Step 106, the program reads the list of virtual machines that should be replicated from the VM replication list table of FIG. 4. In Step 107, the program interrogates the hypervisor to determine a list of virtual volumes associated with each of the selected virtual machines and initializes the virtual machine (VM) and virtual volume columns in a VM to volume mapping table of FIG. 6. In Step 108, the program (e.g., in software or module) identifies the logical volumes that contain the virtual volumes. In Step 109, the program fills in the logical volume column of the VM to volume mapping table of FIG. 6. The program iterates over all the virtual machines identified in Step 106. In Step 110, the program reduces the duplicate logical volumes contained in the logical volume column of the VM to volume mapping table of FIG. 6 to create a logical volume replication list table for the creation of a new replication buffer according to the first embodiment as shown in FIG. 7, which is the output of Step 111. Next, the process proceeds to Phase 2 for the creation of a new replication buffer.

I.A.2 Modification of an Existing Replication Buffer

Figure 8:
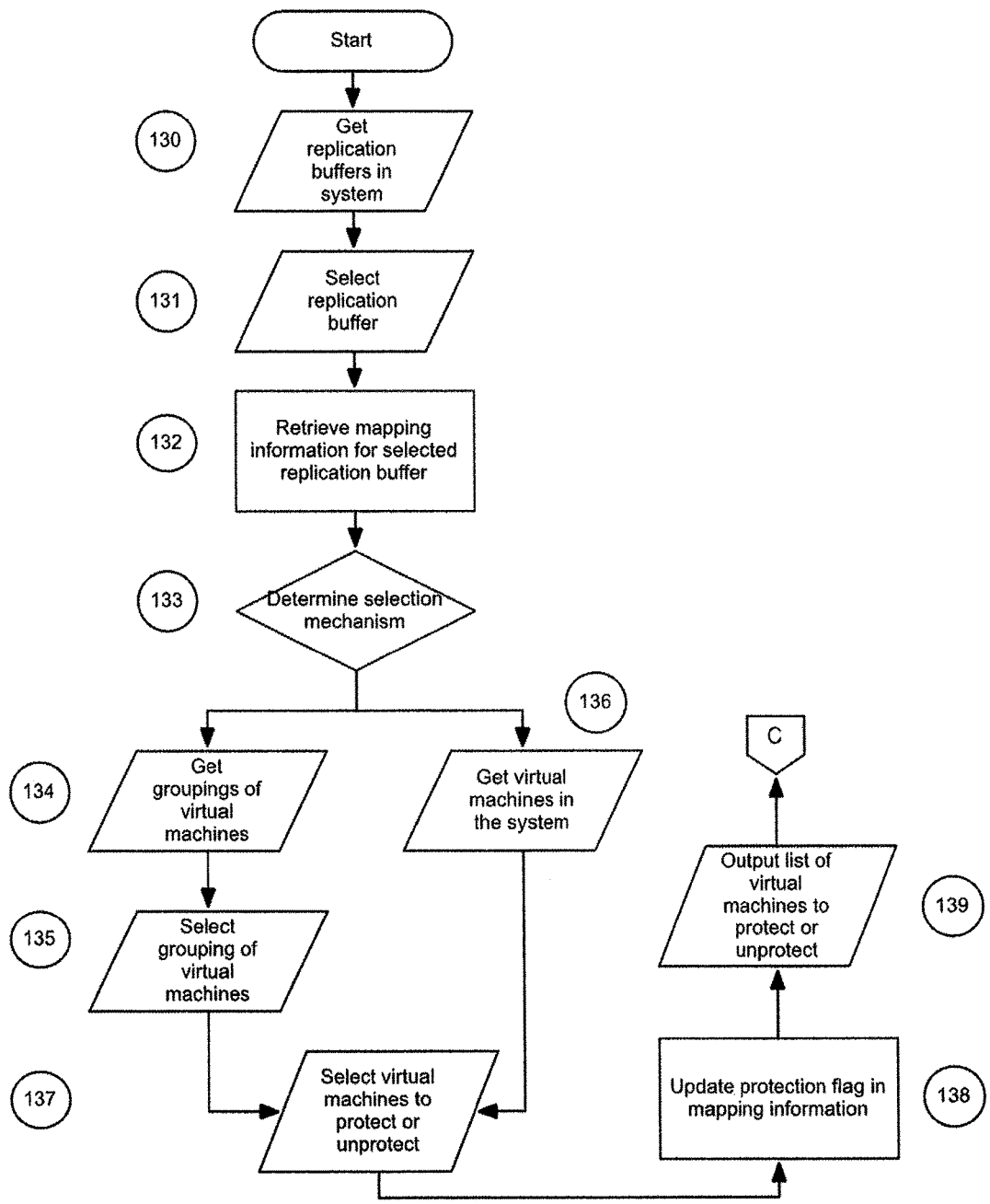
FIG. 8 shows an example of a flow diagram illustrating a process for identifying virtual machines to protect in the modification of an existing replication buffer according to the first embodiment.

FIG. 8 shows an example of a flow diagram illustrating a process for identifying virtual machines to protect in the modification of an existing replication buffer according to the first embodiment. In Step 130, the program gets the list of existing replication buffers. A selection is made as to which replication buffer should be modified in Step 131. In Step 132, a VM protection flag table of FIG. 9 is initialized with the contents of the virtual machines that are currently being protected by the selected replication buffer. This information is determined by the output of Step 105 in FIG. 3 when the replication buffer was created. It contains columns of VM list of VM identifiers and protection flag of true/false. The protection flag corresponding to a particular VM identifier indicates whether the virtual machine should be protected in the replication buffer. The VM protection flag table of FIG. 9 is initialized with the protection flag set to true for all virtual machines currently contained in the replication buffer.

Returning to FIG. 8, the program presents a choice of two selection mechanisms to be selected by the user in Step 133. According to one selection mechanism, Step 134 gathers a list of VM groupings through the hypervisor while a selection of which grouping to use for replication is made in Step 135. The selected grouping of virtual machines is presented to the user in Step 137. According to another selection mechanism, Step 136 gathers a list of all virtual machines through the hypervisor and presents that list to the user in Step 137. In Step 137, the user can select the virtual machines to replicate/protect, either from the grouping selected in Step 135 or from the list obtained in Step 136. The selection mechanism in Step 137 uses the protection flag set in the VM protection flag table of FIG. 9 to show which virtual machines are currently protected by this replication buffer. In Step 138, the protect flag in FIG. 9 is updated based on the input selected in Step 137. True indicates that the virtual machine should be protected, and false indicates that the virtual machine should not be protected. The VM protection flag table of FIG. 9 is then stored in the memory and used in subsequent processes, such as the process of FIG. 10.

Figure 10:
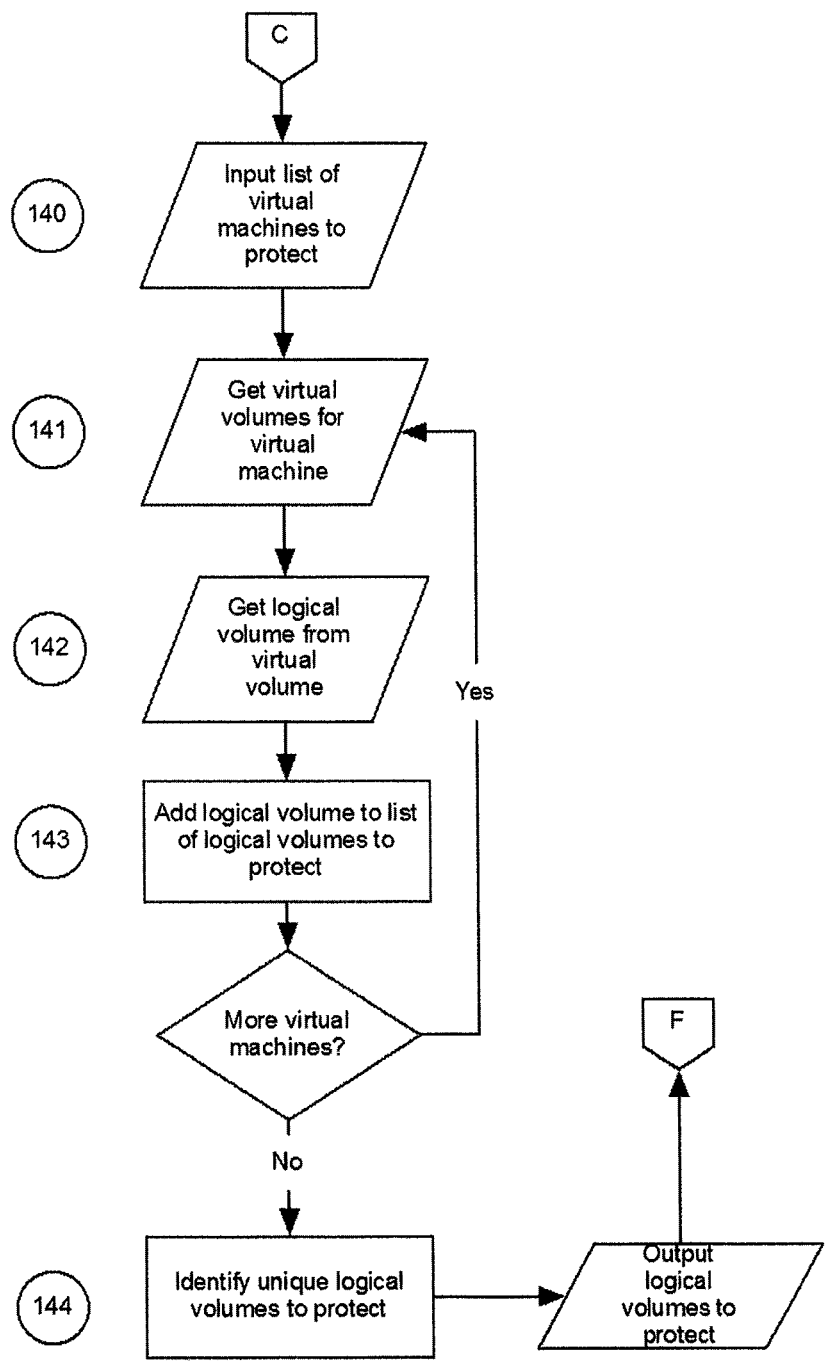
FIG. 10 shows an example of a flow diagram illustrating a process for identifying logical volumes to protect based on the virtual machines identified in the process of FIG. 8 according to the first embodiment.

FIG. 10 shows an example of a flow diagram illustrating a process for identifying logical volumes to protect based on the virtual machines identified in the process of FIG. 8 according to the first embodiment. In Step 140, the program retrieves the list of virtual machines in FIG. 9 and initializes a VM to volume mapping table of FIG. 11 with only the virtual machines that should retain protection or should be newly protected. This is indicated by a true value in the protection flag column in FIG. 9. In Step 141, the program interrogates the hypervisor to determine a list of virtual volumes associated with each of the selected virtual machines with the protection flag set to true from FIG. 9 and initializes the virtual machine and virtual volume columns in the VM to volume mapping table of FIG. 11. In Step 142, the program identifies the logical volumes that contain the virtual volumes. In Step 143, the program fills in the logical volume column of the VM to volume mapping table of FIG. 11. The program iterates over all the virtual machines identified in Step 140. In Step 144, the program reduces the duplicate logical volumes contained in the logical volume column of the VM to volume mapping table of FIG. 11 to create a logical volume replication list table for the modification of an existing replication buffer according to the first embodiment as shown in FIG. 12, which is the output of FIG. 10. Next, the process proceeds to Phase 2 for the modification of an existing replication buffer.

I.B. Phase 2: Calculation

I.B.1 Creation of a New Replication Buffer

In this second phase for the creation of a new replication buffer, the replication buffer size calculation module (e.g., program) will execute a process to calculate the size of a new local and remote replication buffer, as well as disk group configurations on the local and remote storage arrays. These calculations can be then used to configure a local and remote site for data replication in Phase 3.

Figure 13:
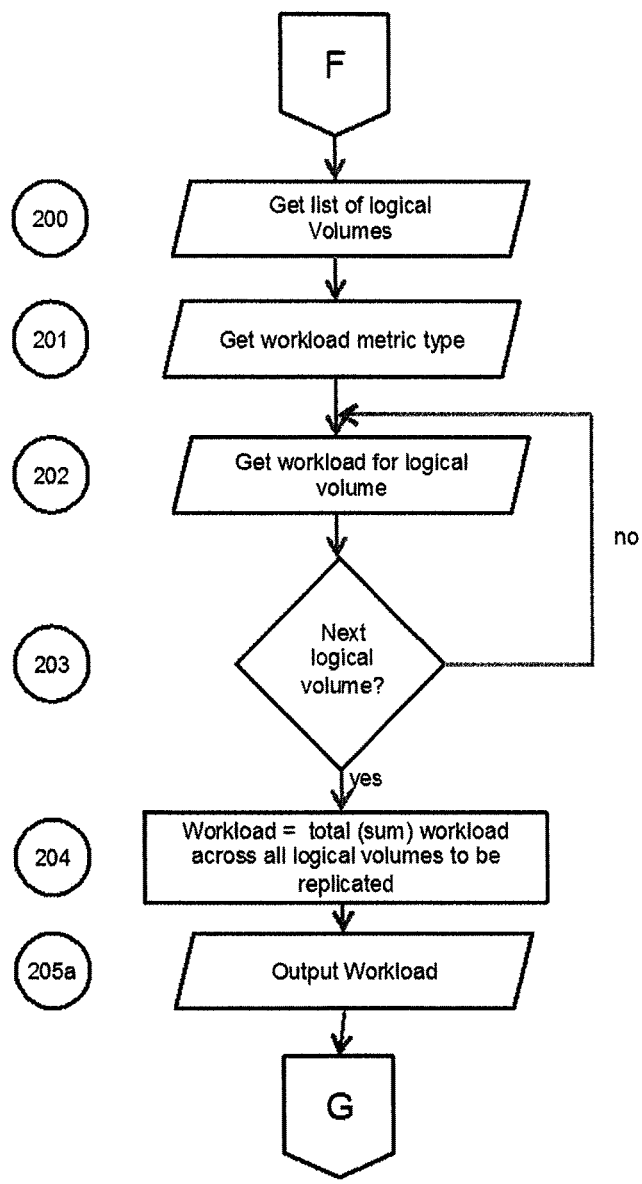
FIG. 13 shows an example of a flow diagram illustrating a process for calculating workload.
Figures 14, 15:
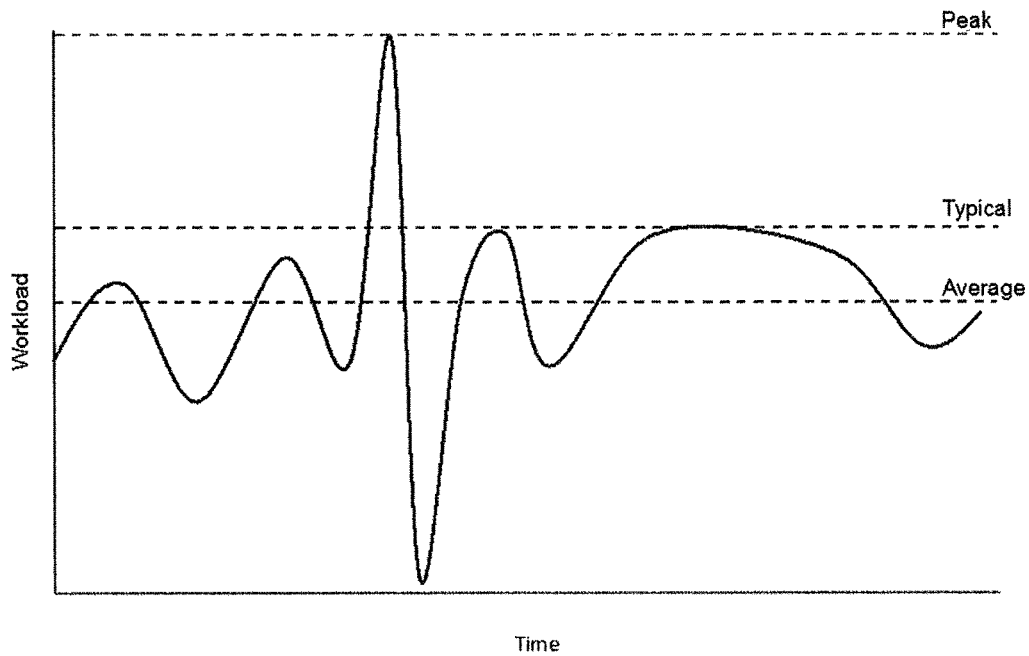
FIG. 14 shows the relationship among three workload metric types.
FIG. 15 shows an example of a calculated workload value.

FIG. 13 shows an example of a flow diagram illustrating a process for calculating workload. In Step 200, the program obtains the list of logical volumes identified for protection in Phase 1 and stored in the logical volume replication list table of FIG. 7 in the case of Embodiment 1 (or FIG. 51 in the case of Embodiment 2 discussed below). In Step 201, the program identifies the workload metric type to use for calculation: peak, typical, or average. Peak workload is the highest workload the system experiences, typical workload is the highest workload that can be expected during normal operations, and average workload is the average workload over the lifetime of the logical volume. FIG. 14 shows the relationship among these three workload metric types.

In Step 202, the program retrieves the specific workload metric. A user can specify the workload manually, it can be measured against the logical volume, or the workload can be returned by the hypervisor. In Step 203, the program iterates over all logical volumes identified in Step 200. In Step 204, the program calculates the total workload over all volumes by adding all the workload metrics retrieved in Step 202 for each logical volume identified in Step 200. In Step 205*a*, the program stores the total workload for use in later calculations in a calculated workload value shown in FIG. 15.

Figure 16:
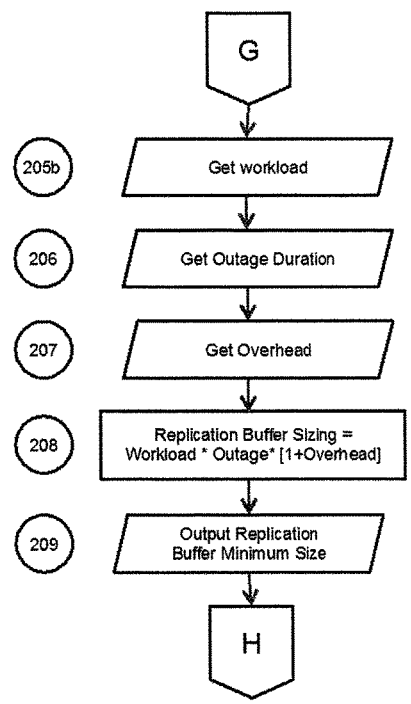
FIG. 16 shows an example of a flow diagram illustrating a process for calculating replication buffer size based on the calculated workload value from FIG. 13.

FIG. 16 shows an example of a flow diagram illustrating a process for calculating replication buffer size based on the calculated workload value from FIG. 13. In Step 205*b*, the program retrieves the total workload calculated in FIG. 13 and stored in the calculated workload value shown in FIG. 15. The program gets the Outage Duration in Step 206 and Overhead in Step 207. The outage duration is an input value requested from the user while overhead is a hardcoded value stored in the system (e.g., system software). In step 208, the program calculates the replication buffer size using the formula:

Replication buffer sizing=(Workload)*Outage Duration*[1+Overhead]

In Step 209, the program stores the replication buffer sizing for use in later calculations in a calculated replication buffer minimum size value shown in FIG. 17.

Figure 18:
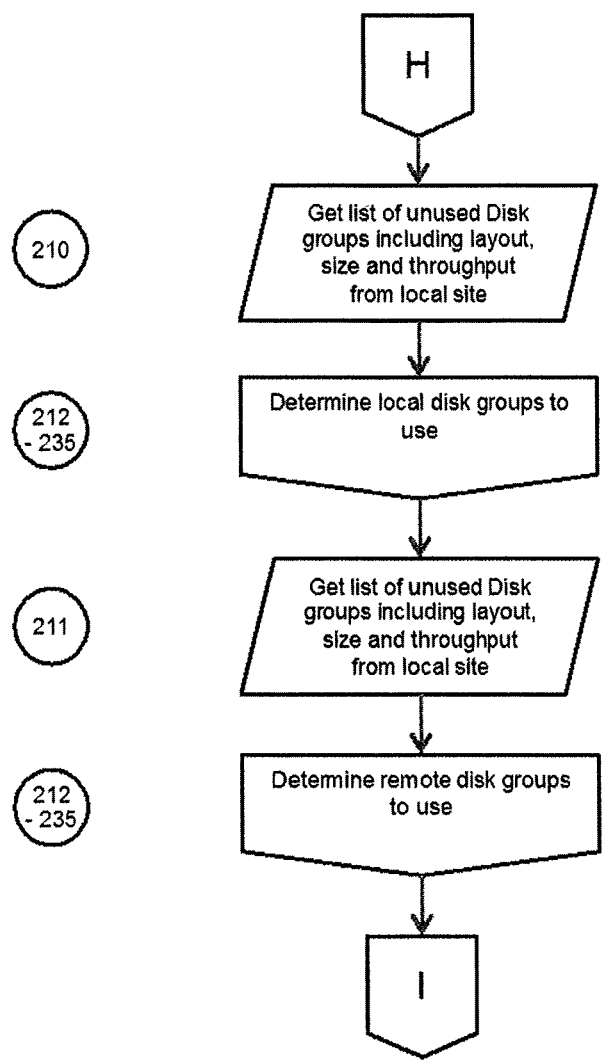
FIG. 18 shows an example of a flow diagram illustrating a process for determining disk groups to use based on replication buffer criteria.
Figure 32:
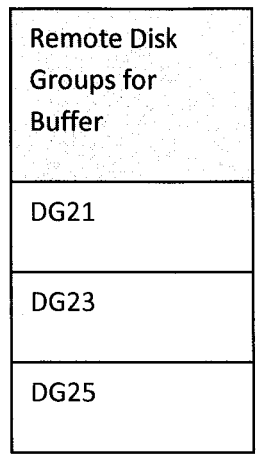
FIG. 32 shows an example of a table of remote disk groups for buffer as the output of the subordinate process to calculate required disk groups of FIGS. 26-28.
Figure 32A:
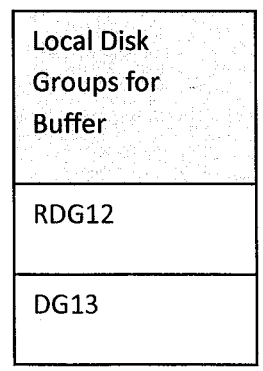
FIG. 32A shows an example of a table of local disk groups for buffer as the output of the subordinate process to calculate required disk groups of FIGS. 26-28.

FIG. 18 shows an example of a flow diagram illustrating a process for determining disk groups to use based on replication buffer criteria. At the local site, in Step 210, the program gets a list of unused local disk groups from the storage array and stores the list in memory as a table of unused local disk groups (local site) shown in FIG. 19. The table has columns of disk group name, layout/size, and throughput. The program passes the list of unused local disk groups in FIG. 19 as an input to the subordinate process identified in Steps 212 through 235 shown in FIGS. 26-28 and described below under Phase 2 Subordinate Process to Calculate Required Disk Groups. The output from the subordinate process is a list of local disk groups that match the criteria for the local replication buffer. The process will store the output in memory in a table of local disk groups for buffer for the creation of a new replication buffer as shown in FIG. 32A.

At the remote site, in Step 211, the program gets a list of unused remote disk groups from the storage array and stores the list in memory as a table of unused remote disk groups (remote site) shown in FIG. 20. The program passes the list of unused remote disk groups in FIG. 20 as an input to the subordinate process identified in Steps 212 through 235 shown in FIGS. 26-28 and described below under Phase 2 Subordinate Process to Calculate Required Disk Groups. The output from the subordinate process is a list of remote disk groups that match the criteria for the remote replication buffer. The process will store the output in memory in a table of remote disk groups for buffer for the creation of a new replication buffer as shown in FIG. 32.

The process then proceeds to Phase 3 (Step 300 in FIG. 36) below for creation of the replication buffers.

I.B.2 Modification of an Existing Replication Buffer

In this second phase for the modification of an existing replication buffer, the replication buffer size calculation module (e.g., program) will execute a process to calculate the new size of an existing replication buffer, as well as disk group configurations on the local and remote storage arrays. These calculations can be then used to reconfigure a local and remote site for data replication in Phase 3.

The process utilizes the process in FIG. 13 for calculating workload and the process of FIG. 16 for calculating replication buffer size based on the calculated workload value from FIG. 13. The outputs of those steps are the values found in the calculated workload value of FIG. 15 and the calculated replication buffer minimum size value of FIG. 17.

Figure 23:
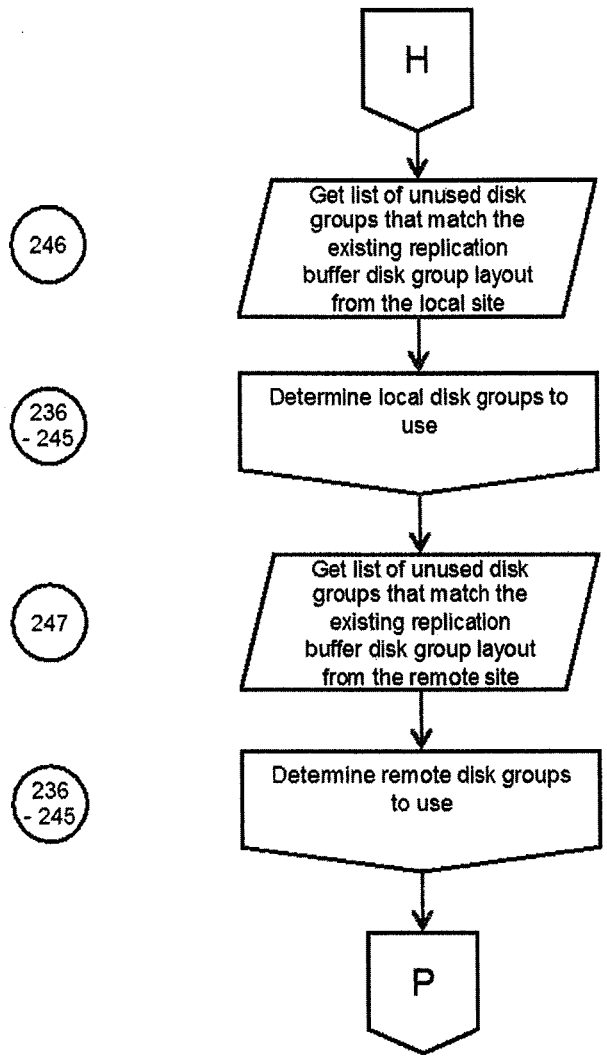
FIG. 23 shows an example of a flow diagram illustrating a process for determining disk groups to use based on replication buffer criteria.

FIG. 23 shows an example of a flow diagram illustrating a process for determining disk groups to use based on replication buffer criteria. At the local site, in Step 246, the program retrieves the existing replication buffer configuration previously calculated and stored in FIG. 32A from the local storage array and stores this list in memory in a table of local disk groups in the existing replication buffer shown in FIG. 24, augmenting the table with the throughput capabilities of the disk group. The table has columns of disk group name, layout/size, and throughput. The program passes the list of local disk groups in FIG. 24 as an input to the subordinate process identified in Steps 236 through 245 shown in FIGS. 33 and 34 and described below under Phase 2 Subordinate Process to Calculate Required Modified Disk Groups. The output from the subordinate process is a list of local disk groups that match the criteria for the local replication buffer. The process will store the output in memory in a table of local disk groups for buffer for the modification of an existing local replication buffer (similar in form to the table of local disk groups for buffer for the creation of a new replication buffer of FIG. 32A).

At the remote site, in Step 247, the program retrieves the existing replication buffer configuration previously calculated and stored in FIG. 32 from the remote storage array and stores this list in memory as a table of remote disk groups in the existing replication buffer shown in FIG. 25, augmenting the table with the throughput capabilities of the disk group. The program passes the list of remote disk groups in FIG. 25 as an input to the subordinate process identified in Steps 236 through 245 shown in FIGS. 33 and 34 and described below under Phase 2 Subordinate Process to Calculate Required Modified Disk Groups. The output from the subordinate process is a list of remote disk groups that match the criteria for the remote replication buffer. The process will store the output in memory in a table of remote disk groups for buffer for the modification of an existing remote replication buffer (similar in form to the table of remote disk groups for buffer for the creation of a new replication buffer of FIG. 32).

Figure 41:
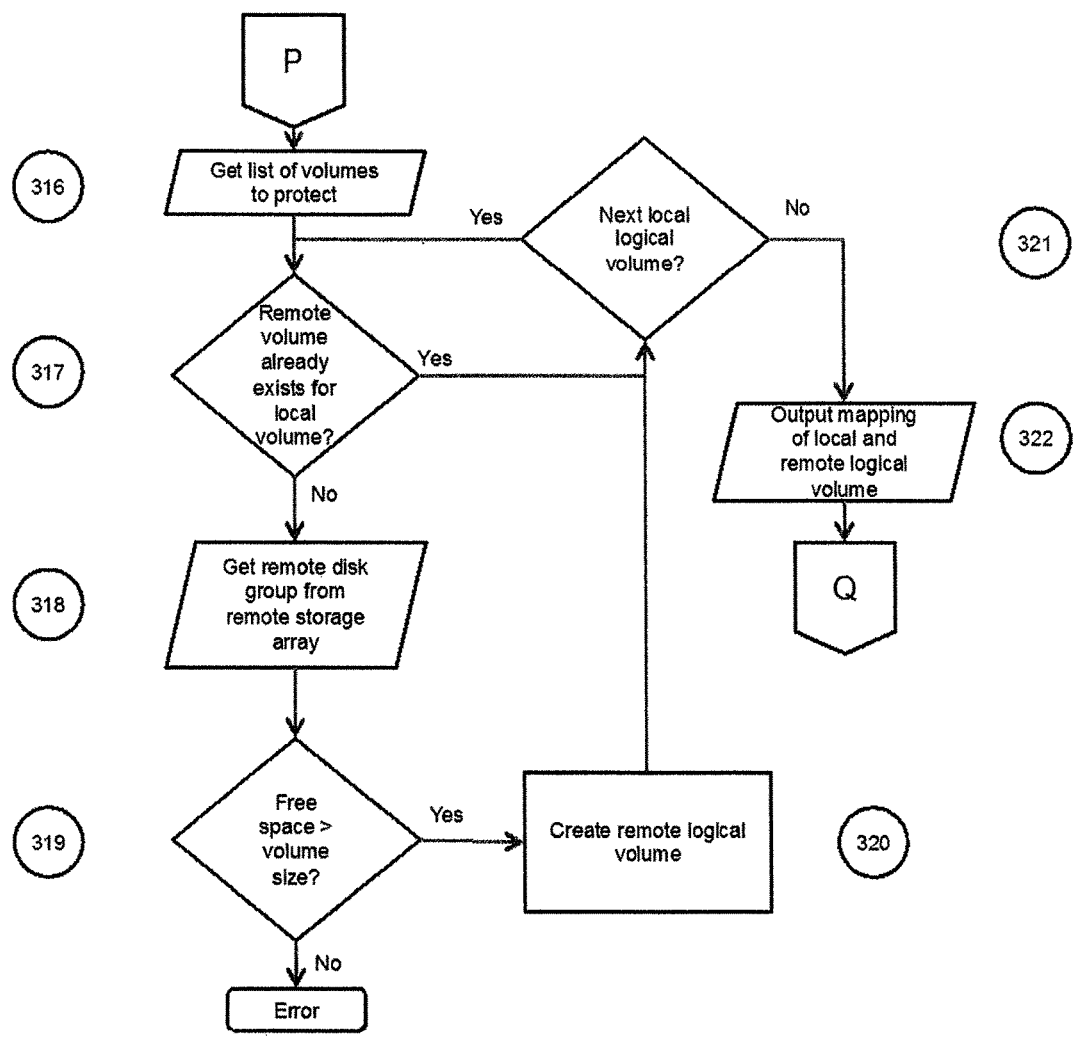
FIGS. 41-45 show an example of a flow diagram illustrating a process for modifying an existing replication buffer.

The process then proceeds to Phase 3 (Step 316 in FIG. 41) below for modification of the replication buffers.

I.A.3 Phase 2 Subordinate Process to Calculate Required Disk Groups

Figure 26:
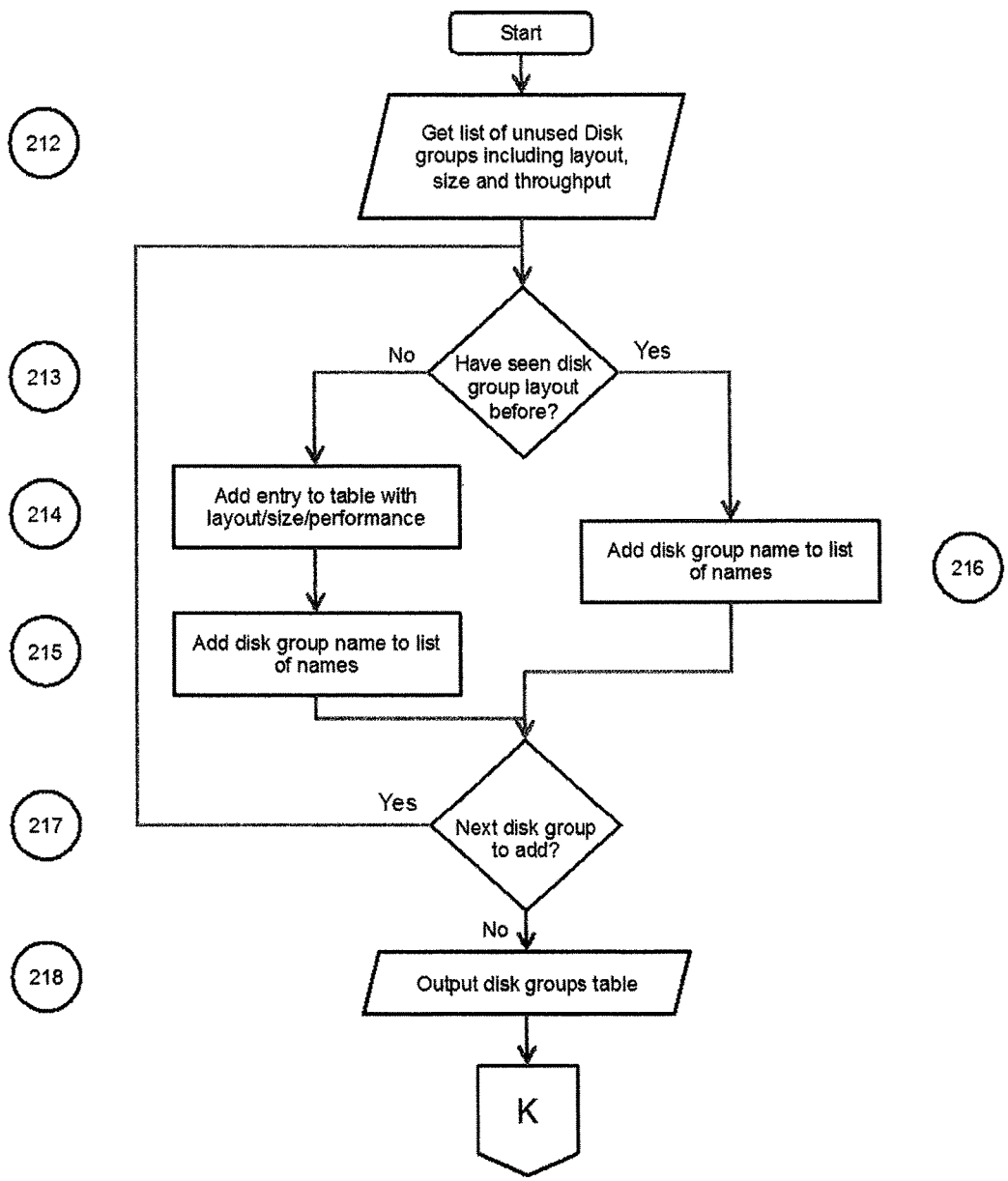
FIGS. 26-28 show an example of a flow diagram illustrating a subordinate process for calculating required disk groups for creation of a new replication buffer.
Figure 27:
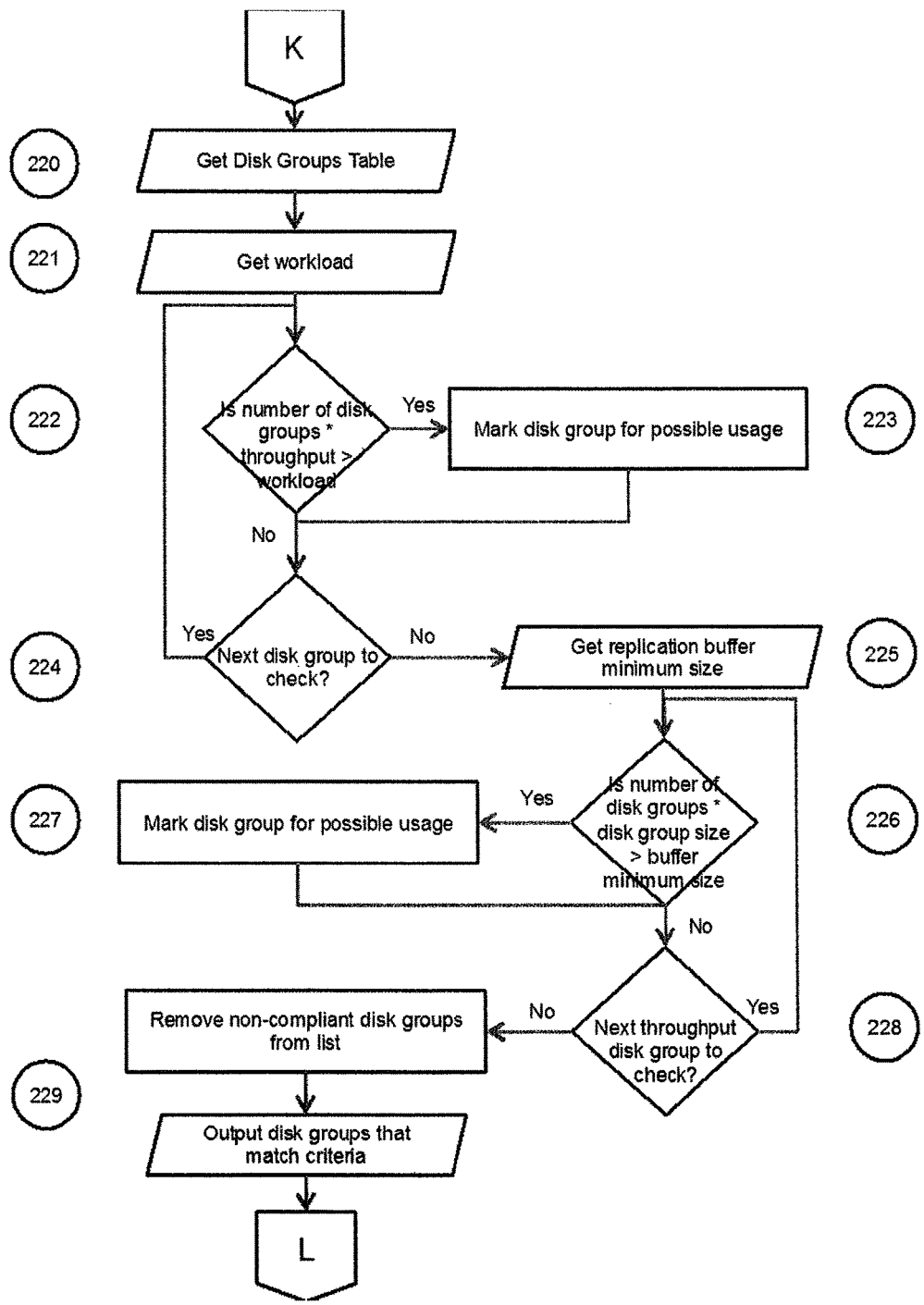
Figure 28:
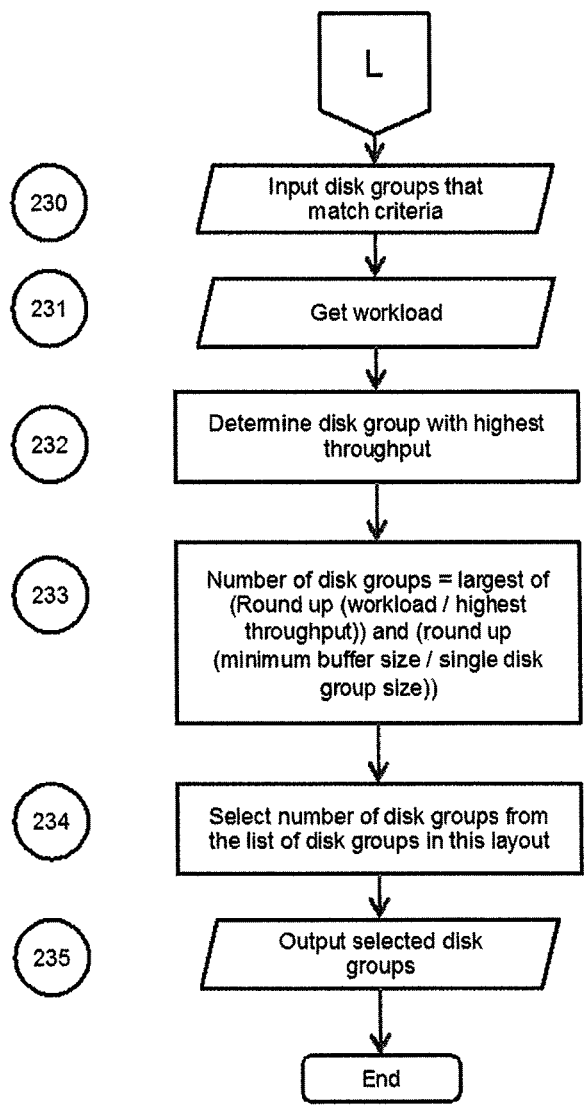

FIGS. 26-28 show an example of a flow diagram illustrating a subordinate process for calculating required disk groups for creation of a new replication buffer on either a local or a remote system. The subordinate process starts at Step 212 for gathering the input that is the list of disk groups including the layout, size, and throughput stored in memory as the table of unused local disk groups of FIG. 19 for the local site calculation (or the table of unused remote disk groups of FIG. 20 for the remote site calculation). In Step 213, the program determines if it has seen the disk group layout before in this call of the subordinate process. If it has not seen the disk group layout, the program proceeds to step 214 where it populates an entry (i.e., a row) in a disk groups table as shown in FIG. 29A for local and FIG. 29 for remote which has columns of disk group layout/disk size, list of disk groups, and throughput. In Step 215, the program adds the disk group name to the entry in the disk groups table. If the program has seen the disk group layout before, the program proceeds to Step 216 where it adds the disk group name to an appropriate entry in the disk groups table (i.e., appropriate row for the disk group name to be added). The program iterates through the remaining entries in the input. The output of the process of FIG. 26 is the completed remote disk groups table of FIG. 29 or local disk groups table of FIG. 29A. The process then proceeds to FIG. 27.

In Step 220 of FIG. 27, the program retrieves the disk groups table of FIG. 29/29A which is stored in memory. In Step 221, the program retrieves the calculated workload that was stored in a previous step in memory as the calculated workload value of FIG. 15. In Step 222, the program calculates the total throughput of the count of disk groups for each layout type by multiplying the throughput entry in the disk groups table of FIG. 29/29A by the count of disk group names stored in the same row of the table. If the total throughput is greater than the workload retrieved in Step 220, the disk group is marked as meeting the criteria for the replication buffer workload in Step 223. In Step 224, the program iterates through the remaining entries in the disk groups table. FIG. 30 or FIG. 30A shows the meets throughput column set for those disk groups that meet the throughput criteria.

Figure 17:
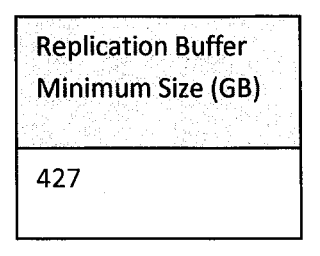

In Step 225, the program retrieves the replication buffer minimum size calculated and stored in the calculated replication buffer minimum size value of FIG. 17. In Step 226, the program calculates the total size of the count of disk groups for each layout type by multiplying the size entry in the disk groups table of FIG. 29/29A by the count of disk group names stored in the same row of the table. If the total size is greater than the replication buffer minimum size retrieved in Step 225, the disk group is marked as meeting the criteria for the replication buffer size in Step 227. In Step 228, the program iterates through the remaining entries in the disk groups table. FIG. 30/30A shows the meets size flag column set for those disk groups that meet the size criteria.

FIG. 30A for local and FIG. 30 for remote is an example of a disk groups table with a meets throughput flag column and a meets size flag column after a completed pass through of the above steps to calculate required disk groups. The meets throughput flag is set to Yes for disk groups that meet the criteria for the replication buffer. The meets size flag is set to Yes for disk groups that meet the criteria for the replication buffer. In Step 229, the program removes the entries in the table of FIG. 30/30A that do not meet both criteria (i.e., replication buffer workload and replication buffer size) and stores the result in a table of disk groups that meet the criteria for the replication buffer as shown in FIG. 31A for local or FIG. 31 for remote. The table of FIG. 31/31A is stored in memory and the process proceeds to FIG. 28.

In Step 230 of FIG. 28, the process starts with the table of FIG. 31A for local or FIG. 31 for remote which contains the list of disk groups that meet the criteria for the replication buffer. In Step 231, the program retrieves the calculated workload from the calculated workload value of FIG. 15. In Step 232, using the table of FIG. 31/31A, the program determines the list of disk groups with the highest throughput value using a maximum function on all values in the column and selects the entry with the highest throughput (80 in FIG. 31/31A). In Step 233, the program calculates the number of disk groups that should be allocated to the replication buffer. It calculates the number of disk groups to meet the minimum workload criteria by dividing the calculated workload from FIG. 15 by the highest throughput value found in Step 232 and rounding the result up to the nearest whole number (first calculated value). The program calculates the number of disk groups needed to meet the minimum size criteria by dividing the replication buffer sizing from the calculated replication buffer minimum size result of FIG. 17 by the disk size value found in the disk group entry with the highest throughput value and rounding the result up to the nearest whole number (second calculated value). The number of disk groups that should be used is the maximum of these two calculated values (first and second calculated values). In Step 234, the program selects the number of disk groups calculated in Step 233 from the disk group entry in the table of FIG. 31/31A and creates a table of disk groups for buffer of FIG. 32/32A as the output of the subordinate process to calculate required disk groups of FIGS. 26-28. If this process of FIGS. 26-28 is performed for the local site, the result will be the table of FIG. 32A. If this process of FIGS. 26-28 is performed for the remote site, the result will be the table of FIG. 32.

Figure 33:
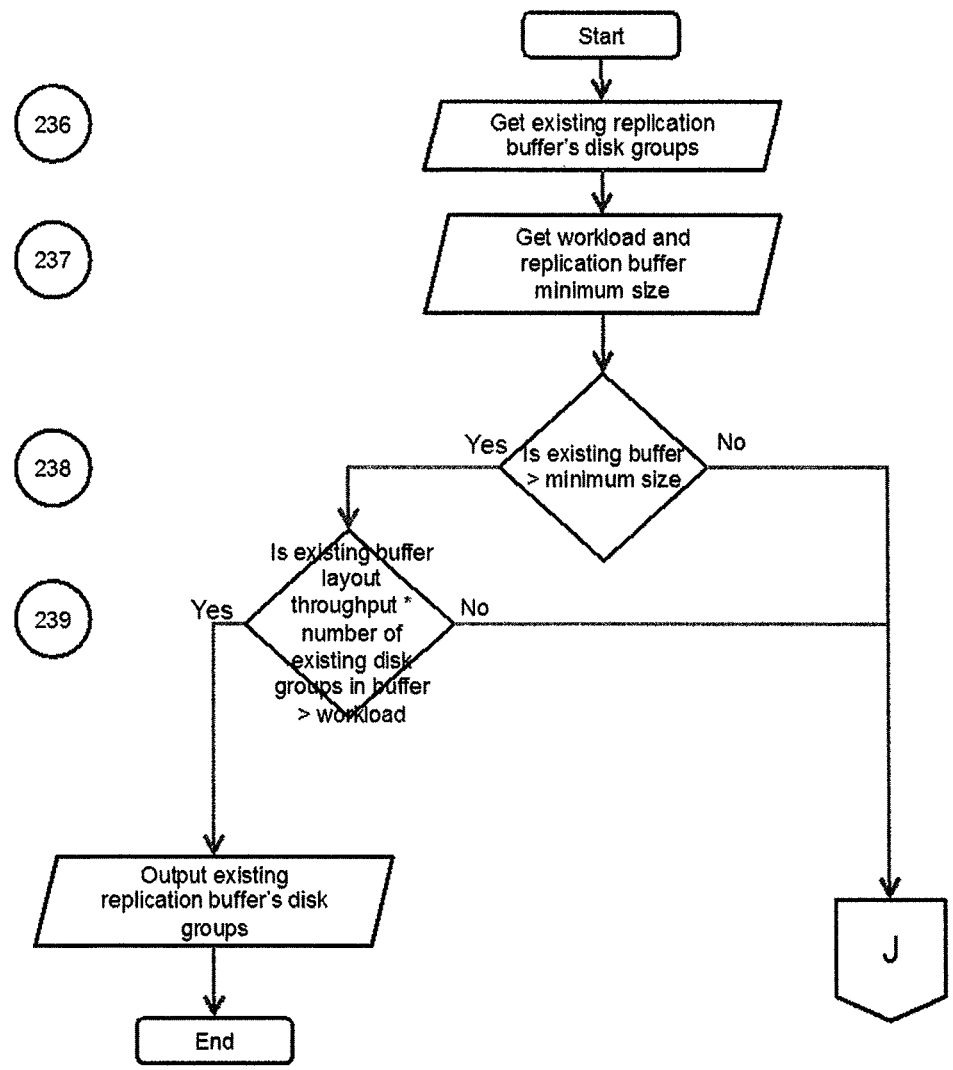
FIGS. 33 and 34 show an example of a flow diagram illustrating a subordinate process for calculating required modified disk groups for modification of an existing replication buffer.
Figure 34:
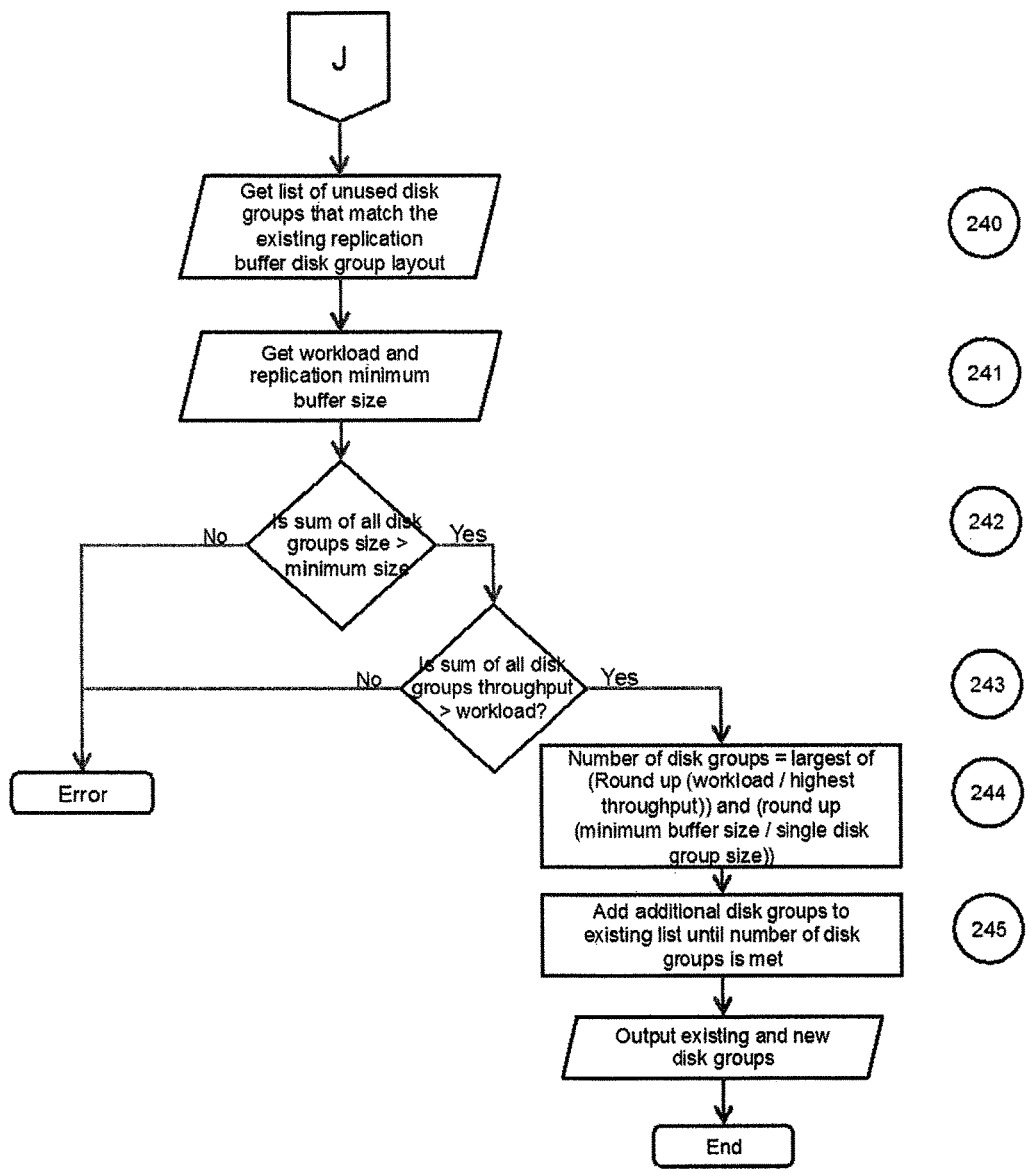

I.B.4 Phase 2 Subordinate Process to Calculate Required Modified Disk Groups FIGS. 33 and 34 show an example of a flow diagram illustrating a subordinate process for calculating required modified disk groups for modification of an existing replication buffer. The subordinate process starts at Step 236 for retrieving the existing replication buffer configuration from the storage array as passed to the subordinate process as the table of disk groups for buffer of FIG. 32A for local or FIG. 32 for remote as the output of the subordinate process to calculate required disk groups of FIGS. 26-28 and the table of local disk groups shown in FIG. 24 for the local site calculation (or the table of remote disk groups shown in FIG. 25 for the remote site calculation) augmenting the table with the throughput capabilities of the disk group. In Step 237, the program retrieves the workload and the replication buffer sizing found in the calculated workload value of FIG. 15 and the calculated replication buffer minimum size value of FIG. 17.

In Step 238, if the size of the existing replication buffer is greater than the required replication buffer sizing, the program proceeds to Step 239. In Step 239, if the disk group throughput times the number of existing disk groups in the replication buffer is greater than the workload, then the process proceeds to Phase 3, as no changes are required to the replication buffer. The output of Phase 2 is the table of existing disk groups stored in memory as the table of disk groups for buffer of FIG. 32/32A as the output of the subordinate process to calculate required disk groups of FIGS. 26-28. If the answer to the calculation in Step 238 or 239 is no, then the process proceeds to FIG. 34.

In Step 240 of FIG. 34, the program retrieves a list of unused disk groups of the same layout type of the disk groups in the replication buffer from the storage array. In Step 241, the program retrieves the workload and replication minimum buffer size from the calculated workload value of FIG. 15 and the calculated replication buffer minimum size value of FIG. 17. In Step 242, the program determines if the existing replication buffer disk group size plus all the free disk groups' size added together is greater than the replication minimum buffer size. If no, then an error condition exists and the program exits the entire process. If yes, then the program proceeds to Step 243 where it sums the throughput of all the existing disk groups with the sum of all the free disk groups available and it determines if the value is greater than the workload. If no, then an error condition exists and the program exits the entire process. If yes, then the program proceeds to Step 244.

In Step 244, the program calculates the total number of disk groups that should be allocated to the replication buffer. It calculates the number of disk groups to meet the minimum workload criteria by dividing the workload from the calculated workload value of FIG. 15 by the highest throughput value and rounding the result up to the nearest whole number (first calculated value). It calculates the number of disk groups needed to meet the minimum size criteria by dividing the replication buffer sizing from the calculated replication buffer minimum size value of FIG. 17 by the disk size value found in the disk group entry with the highest throughput value and rounding the result up to the nearest whole number (second calculated value). The total number of disk groups that should be used is the maximum of these two calculated values (first and second calculated values).

In Step 245, the program adds the existing buffer's disk groups and the required number of disk groups of the appropriate type to the output table stored in memory as the table of disk groups for buffer of FIG. 32/32A, producing the output for the subordinate process of FIGS. 33 and 34 in the form of a table of disk groups for buffer as the output of the subordinate process to calculate required modified disk groups of FIGS. 33 and 34 as shown in FIG. 35A for local disk groups and FIG. 35 for remote disk groups. The tables in FIGS. 35 and 35A include the existing disk groups for the replication buffer as well as the new disk groups that should be added to the replication buffer.

I.C Phase 3: Replication Buffer Creation

This phase is concerned with taking on the list of disk groups to assign to a replication buffer, either creating a new replication buffer on the local and remote sites or reconfiguring an existing replication buffer on the local and remote sites, and establishing replication relationships and data replication. The replication buffer creation of Phase 3 is performed by the replication buffer creation module (e.g., program).

I.C.1 Creation of a New Replication Buffer

Figure 36:
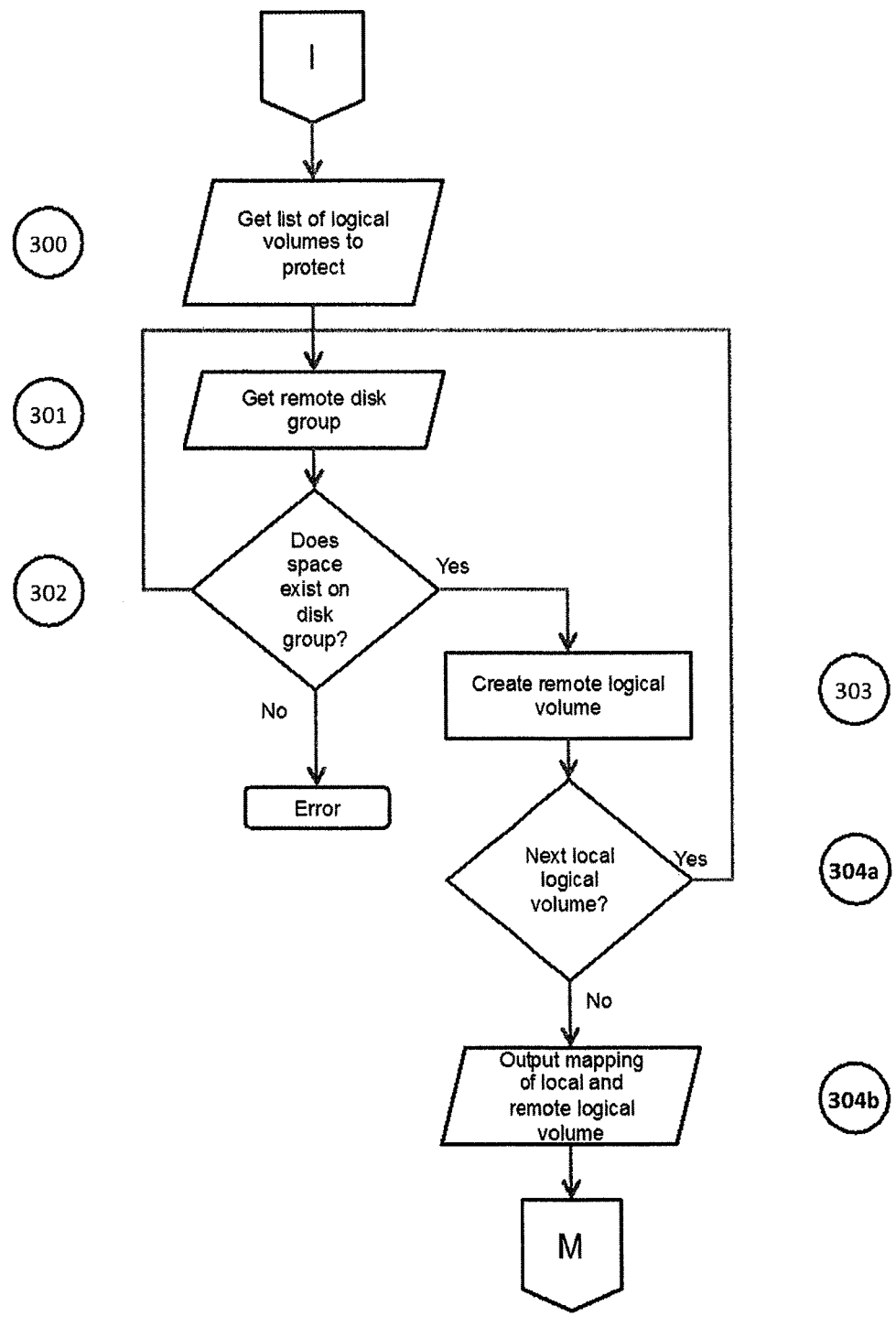
FIGS. 36-38 show an example of a flow diagram illustrating a process for creation of a new replication buffer.
Figure 37:
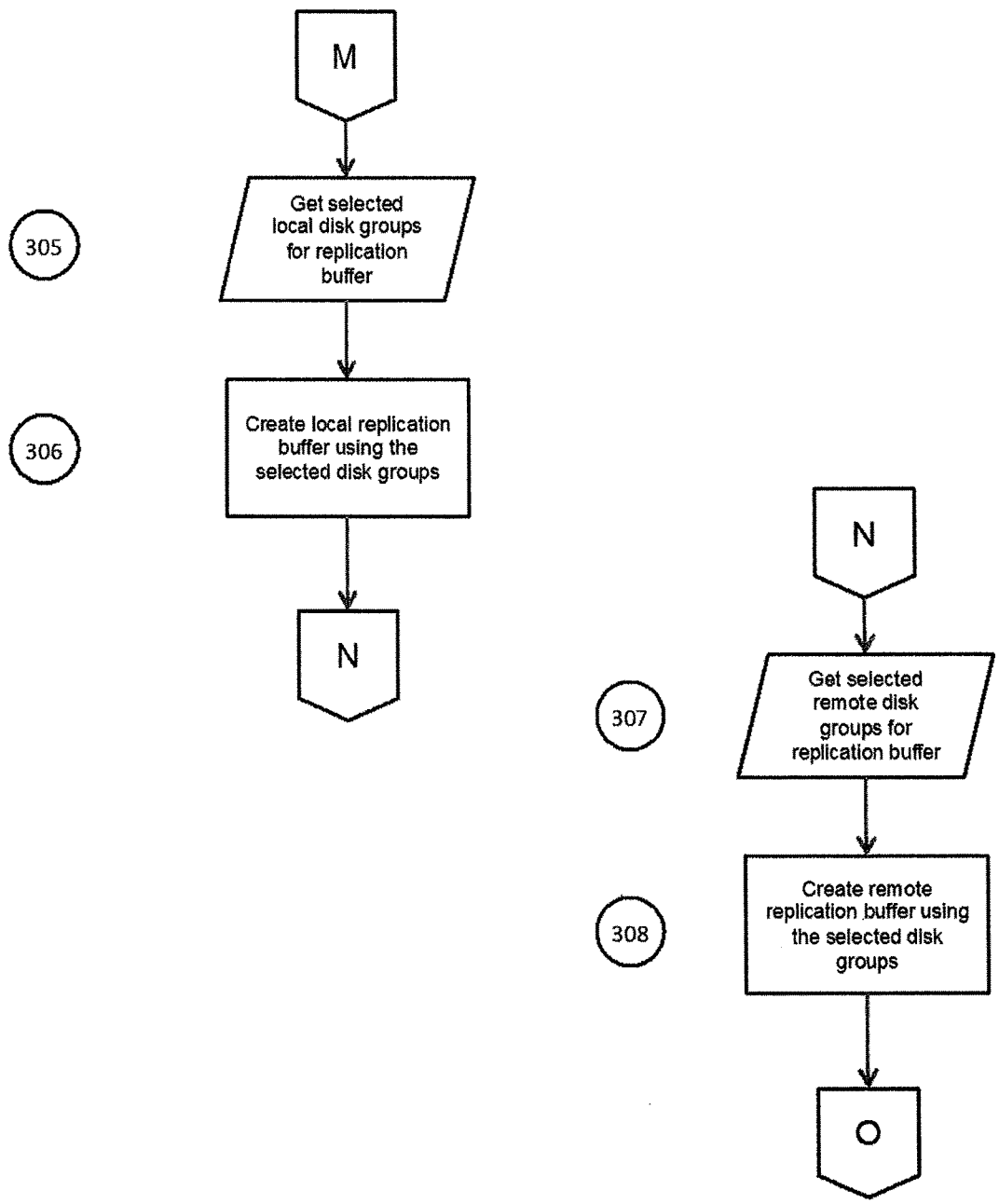
Figure 38:
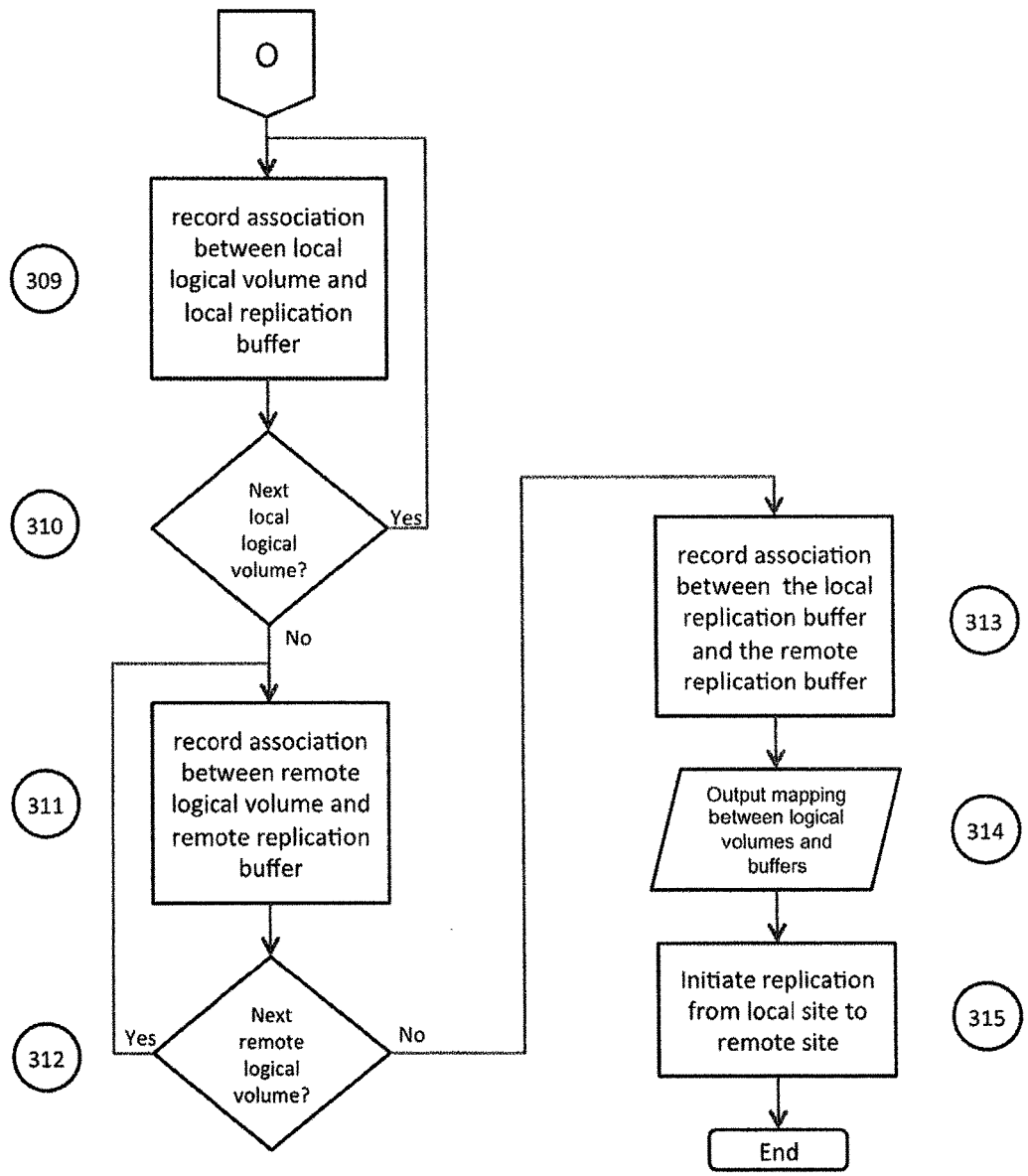

FIGS. 36-38 show an example of a flow diagram illustrating a process for creation of a new replication buffer. FIG. 36 creates remote local volumes and outputs mapping of local and remote logical volumes. FIG. 37 creates the local replication buffer and the remote replication buffer. FIG. 38 associates local logical volumes with the local replication buffer, associates remote logical volumes with the remote replication buffer, associates the local replication with the remote replication buffer, and initiates replication from the local site to the remote site.

Figures 50, 51:
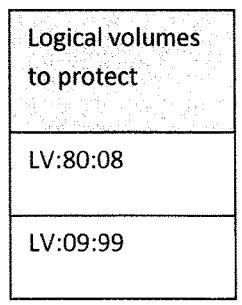
FIG. 50 shows an example of a VM to new logical volume mapping table for the creation of a new replication buffer according to the second embodiment.
FIG. 51 shows an example of a logical volume replication list table for the creation of a new replication buffer according to the second embodiment.

In Step 300 of FIG. 36, the program retrieves the list of logical volumes to protect which was the output of Phase 1 and stored in the logical volume replication list table for the creation of a new replication buffer of FIG. 7 for Embodiment 1 or the logical volume replication list table for the creation of a new replication buffer of FIG. 51 for Embodiment 2. The program transfers the appropriate data to a local logical volume column of a local to remote volume mapping table shown in FIG. 39. The table also includes a remote logical volume column. In Step 301, the program communicates with the remote controller to retrieve the equivalent disk group where remote logical volumes need to be created for replication. In Step 302, the program determines if sufficient space exists on the remote disk group for all the remote logical volumes required to support replication. If sufficient space does not exist, then an error condition exists and the program exits the entire process. If sufficient space exists, the program proceeds to Step 303. In Step 303, the program creates the remote logical volume of the same size as the local logical volume. In Step 304a, the program iterates over the remaining logical volumes contained in the local to remote volume mapping table of FIG. 39. When the program finishes creating all remote logical volumes, it updates the local to remote volume mapping table of FIG. 39 in Step 304b with the remote logical volume identifiers that were created. The process proceeds to FIG. 37.

In Step 305 of FIG. 37, the program retrieves the list of local disk groups that should be used to create the new replication buffer on the local storage array. The list of local disk groups was calculated in Phase 2 and stored in the table of local disk group for buffer of FIG. 32A. In Step 306, the program creates the local replication buffer on the local storage array and associates the disk groups retrieved in Step 305 with the buffer. In Step 307, the program retrieves the list of remote disk groups that should be used to create the new replication buffer on the remote storage array. The list of remote disk groups was calculated in Phase 2 and stored in the table of remote disk group for buffer of FIG. 32. In Step 308, the program creates the remote replication buffer on the remote storage array and associates the disk groups retrieved in Step 307 with the buffer. The process then proceeds to FIG. 38.

In Step 309 of FIG. 38, the program associates the local logical volume found in FIG. 39 with the local replication buffer created in Step 306. The association is recorded in a local to remote volume and replication buffer mapping table as shown in FIG. 40. In Step 310, the program iterates over the remaining local logical volumes. In Step 311, the program associates the remote logical volume found in FIG. 39 with the remote replication buffer created in Step 308. The association is recorded in the local to remote volume and replication buffer mapping table of FIG. 40. In Step 312, the program iterates over the remaining remote logical volumes. In Step 313, the program records the association between the local replication buffer and the remote replication buffer with the storage array. In Step 314, the program stores the local to remote volume and replication buffer mapping table of FIG. 40 in permanent storage (e.g., in the management computer). In Step 315, the program initiates replication between the local replication buffer and the remote replication buffer. The process of the replication buffer creation module for Phase 3 is now complete.

I.C.2 Modification of an Existing Replication Buffer

FIGS. 41-45 show an example of a flow diagram illustrating a process for modifying an existing replication buffer. In Step 316 of FIG. 41, the program retrieves the list of logical volumes to protect which was the output of Phase 1 and stored in either the logical volume replication list table for the modification of an existing replication buffer of FIG. 12 for Embodiment 1 or the logical volume replication list table for the modification of an existing replication buffer of FIG. 22 for Embodiment 2. The program transfers the appropriate data to the local logical volume column of the local to remote volume mapping table of FIG. 39.

In Step 317, the program determines if a remote logical volume exists for the local logical volume by looking at the local to remote volume and replication buffer mapping table of FIG. 40 that was created and stored on disk. If a remote logical volume exists, the program iterates over the remaining local logical volumes in Step 321. If a remote logical volume does not exist, the program proceeds to Step 318 where it gets the remote disk group from the remote storage array. In Step 319, the program determines if sufficient space exists on the remote disk group. If enough space does not exist, then an error condition exists and the program exits the entire process. If enough space exists, the program creates the remote logical volume in Step 320 and then iterates over the remaining local logical volumes in Step 321. In Step 322, the program records the mapping of local logical volumes to remote logical volumes by updating the local to remote volume mapping table of FIG. 39. The process continues to FIG. 42.

Figure 42:
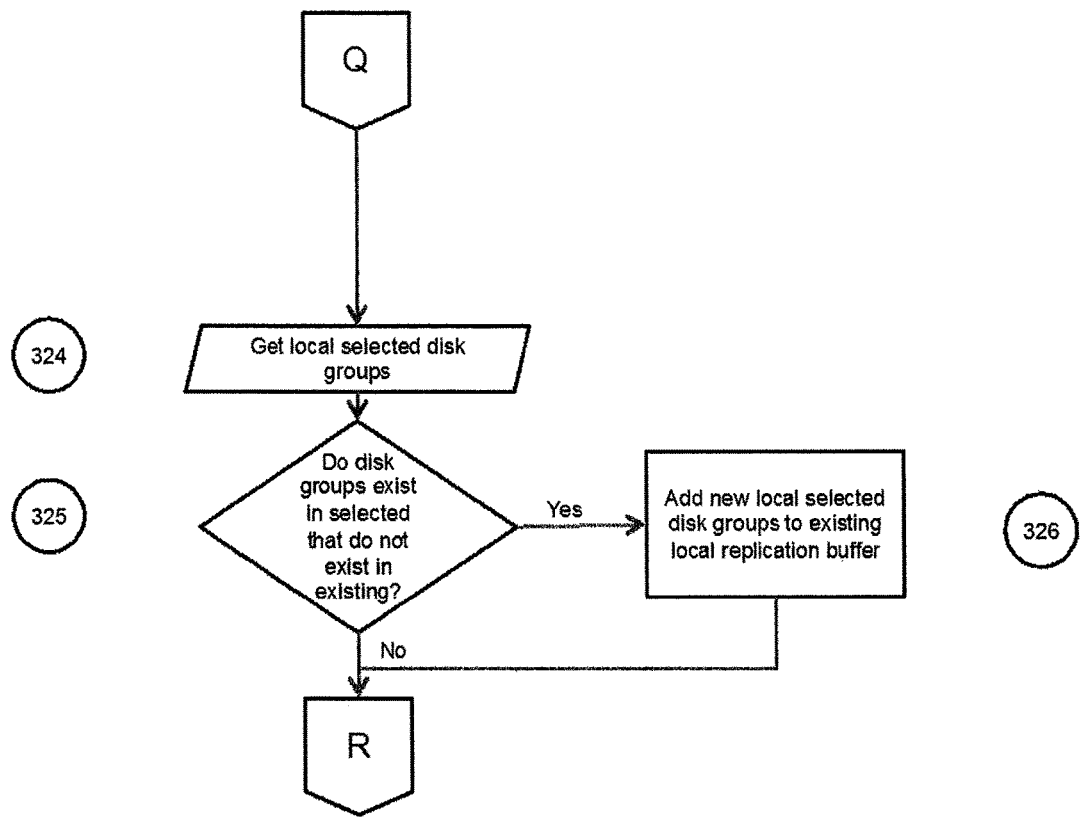

In Step 324 of FIG. 42, the program gets the list of selected local disk groups that were selected by the output of Phase 2 (FIG. 35A for local site calculation). In Step 325, the program determines if any of the selected local disk groups from step 324 are not contained in the existing local replication buffer. If there are any that do not exist, the program adds those disk groups that do not exist to the local replication buffer in step 326. The process continues to FIG. 43.

Figure 43:
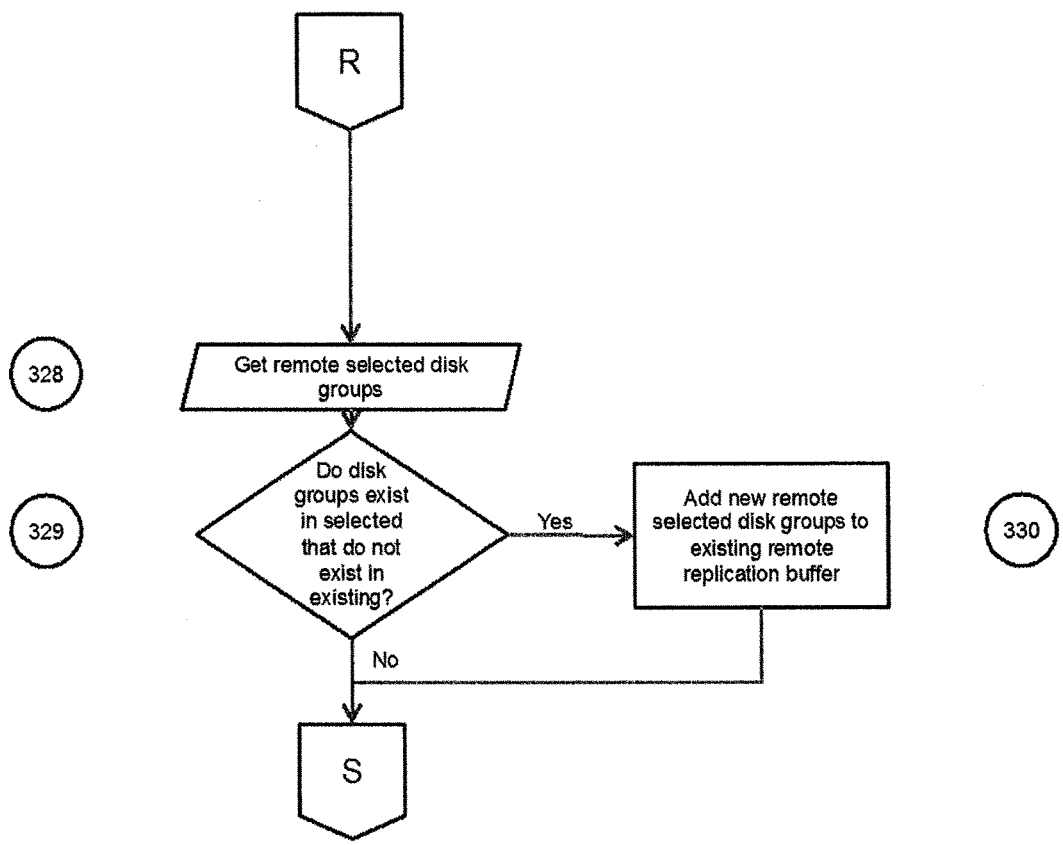

In Step 328 of FIG. 43, the program gets the list of selected remote disk groups that were selected by the output of Phase 2 (FIG. 35 for remote site calculation). In Step 329, the program determines if any of the selected remote disk groups from step 328 are not contained in the existing remote replication buffer. If there are any that do not exist, the program adds those disk groups that do not exist to the remote replication buffer in step 330. The process continues to FIG. 44.

Figure 44:
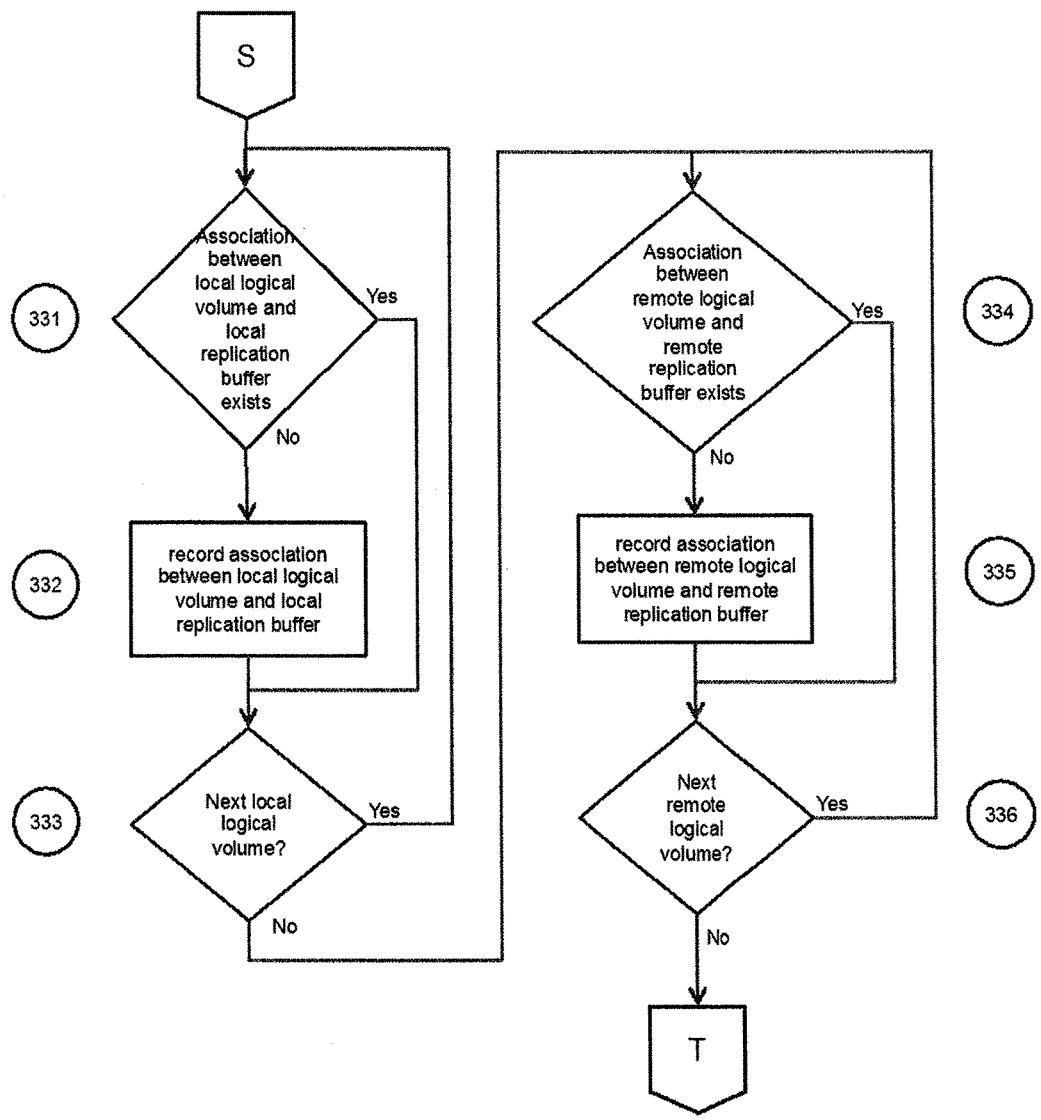

In Step 331 of FIG. 44, the program determines if an association already exists between the local logical volume and the local replication buffer. The program determines if the association exists by referring to the local to remote volume and replication buffer mapping table of FIG. 40 stored on disk when the replication was initially created. If the association exists, the program proceeds to Step 333. If the association does not exist, the program establishes the association between the local logical volume and the local replication buffer in Step 332 and updates the entry in the local to remote volume and replication buffer mapping table of FIG. 40. The program then iterates over the remaining local logical volumes in Step 333.

In Step 334, the program determines if an association already exists between the remote logical volume and the remote replication buffer. The program determines if the association exists by referring to the local to remote volume and replication buffer mapping table of FIG. 40 stored on disk when the replication was initially created. If the association exists, the program proceeds to Step 336. If the association does not exist, the program establishes the association between the remote logical volume and the remote replication buffer in Step 335 and updates the entry in the local to remote volume and replication buffer mapping table of FIG. 40. The program then iterates over the remaining local logical volumes in Step 336. The process then proceeds to FIG. 45.

Figure 45:
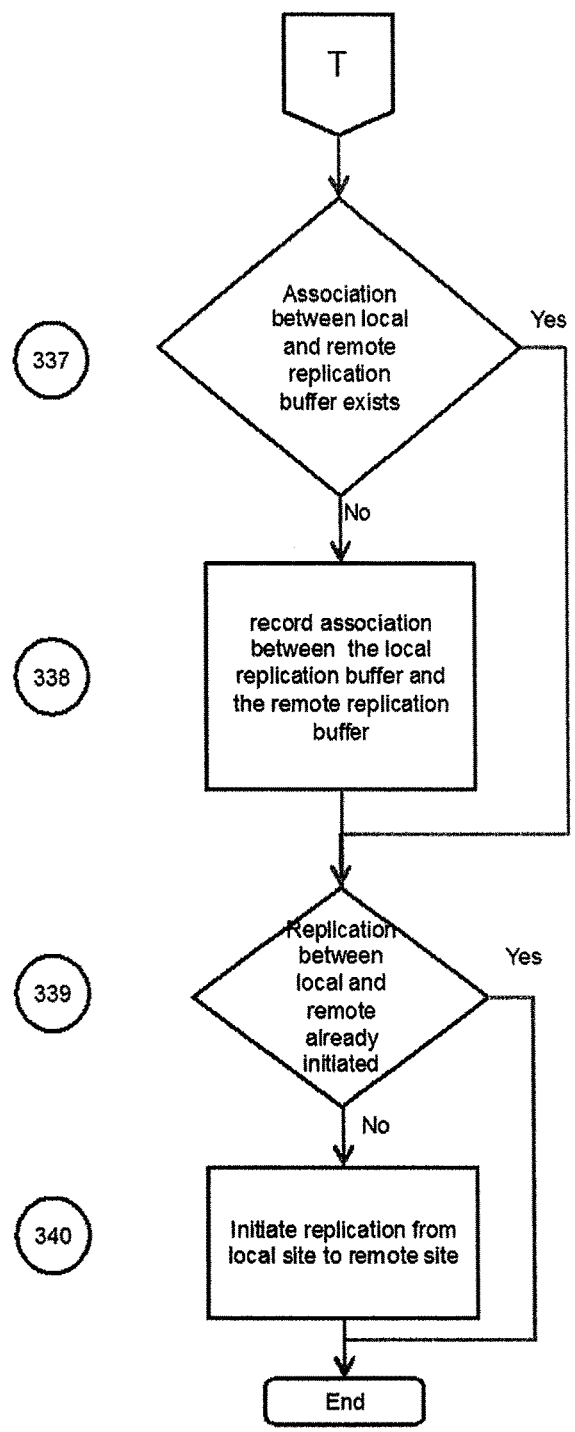

In Step 337 of FIG. 45, the program determines if an association already exists between the local and remote replication buffer. If the association already exists, the program proceeds to Step 339. If it does not exist, the program establishes the association in Step 338 and records it in the local to remote volume and replication buffer mapping table of FIG. 40 and puts in permanent storage (e.g., in the management computer). In Step 339, the program determines if replication has been initiated between the local and remote storage arrays. If it has been initiated, the program exits the process. If it has not been initiated, the program initiates the replication in Step 340 and then exits the process.

II. Embodiment 2

Embodiment 2 involves the identification and migration of selected volumes intended for replication to a minimum subset of volumes contained on equivalent data pools. Phase 2 and Phase 3 of Embodiment 2 are identical to Phase 2 and Phase 3 of Embodiment 1 and are not duplicated in this Embodiment description.

Figure 46:
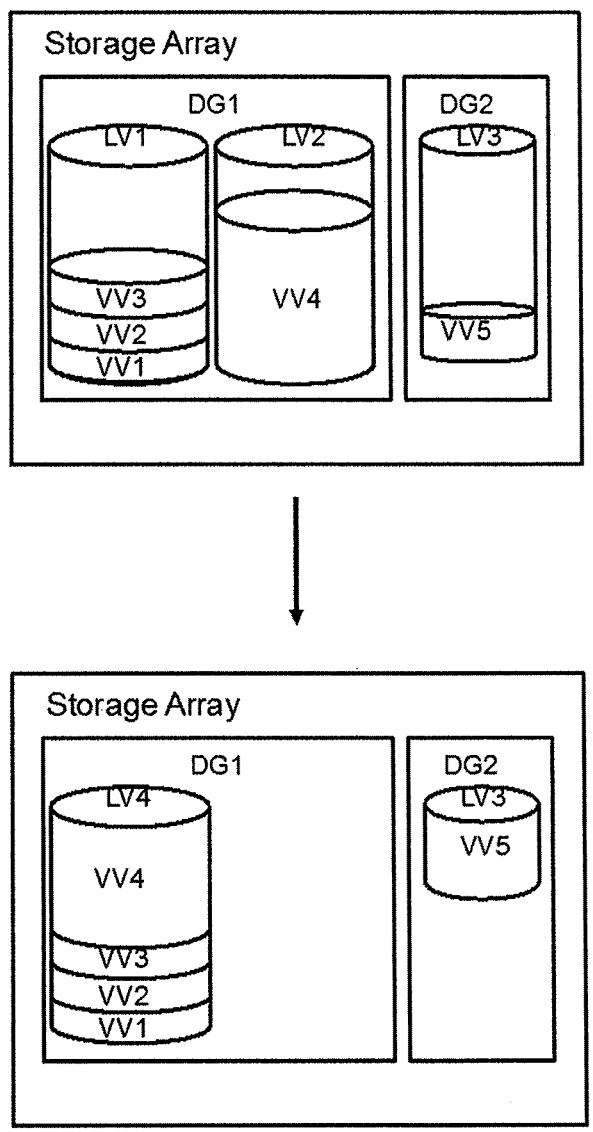
FIG. 46 illustrates the movement and migration of virtual volumes from multiple logical volumes to one or more consolidated logical volumes that are then replicated to the remote system according to the second embodiment of the invention.

FIG. 46 illustrates the movement and migration of virtual volumes from multiple logical volumes (LV1 and LV2 in DG1) to one or more consolidated logical volumes (LV4 in LG1) that are then replicated to the remote system according to the second embodiment. LV stands for logical volume and DG stands for disk group. The consolidated set of replication volumes shown in FIG. 46 are then used in the system shown in FIG. 47 to illustrate a hardware configuration of a system in which the method and apparatus of the invention may be applied according to the second embodiment.

II.A Phase 1: Identification

II.A.1 Creation of New Replication Buffer

The VM and physical volume identification process of Phase 1 for the creation of a new replication buffer starts with the same set of steps that identify the virtual machines to protect from Embodiment 1 found in FIG. 3. The process is performed by the VM and volume identification module (e.g., program). The output of FIG. 3 is the VM replication list table of FIG. 4 which is stored in memory. The Embodiment 2 process now proceeds to FIG. 48.

Figure 48:
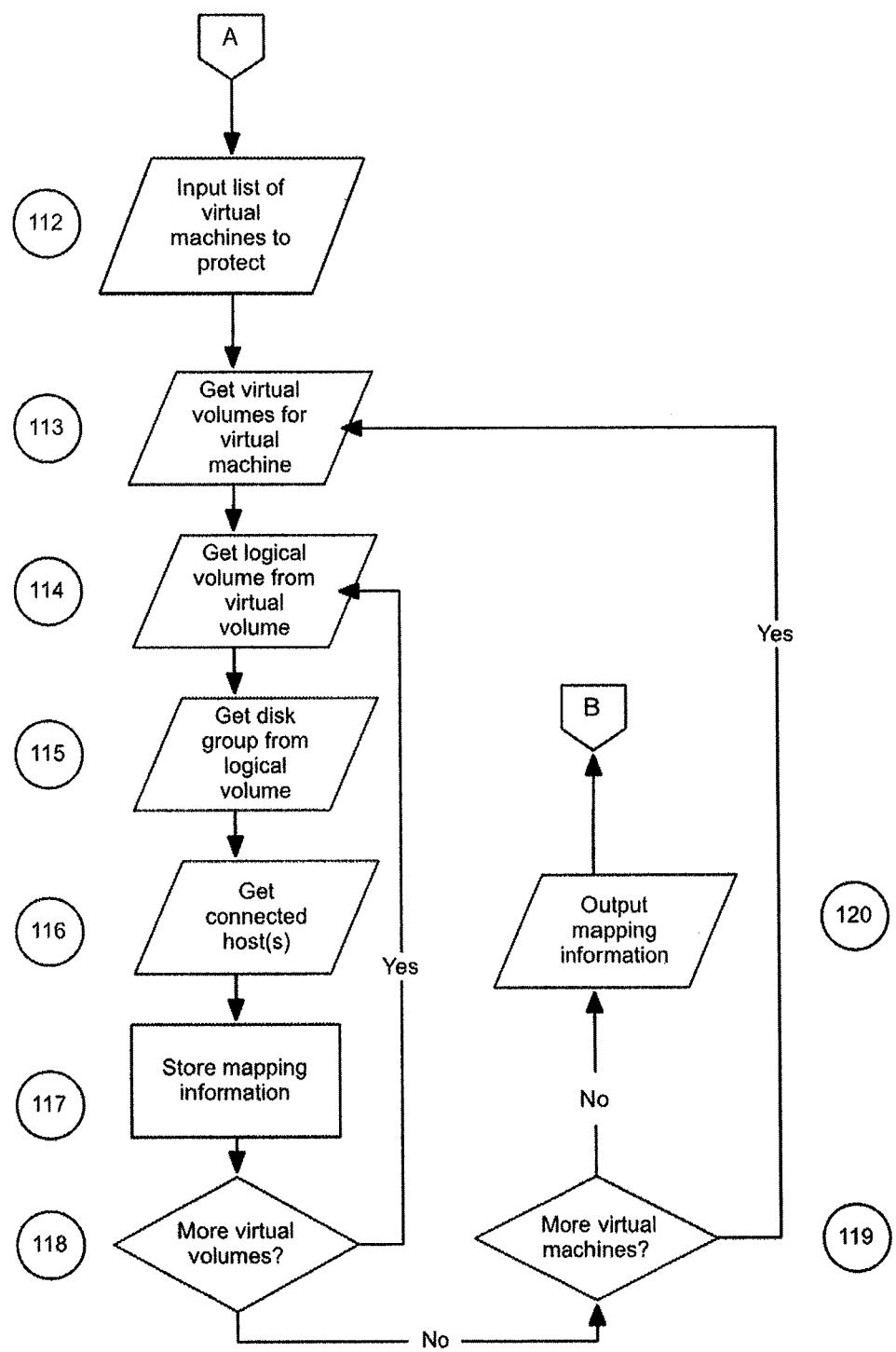
FIGS. 48 and 49 shows an example of a flow diagram illustrating a process for identifying logical volumes to protect based on the virtual machines identified in the process of FIG. 3 according to the second embodiment.
Figure 49:
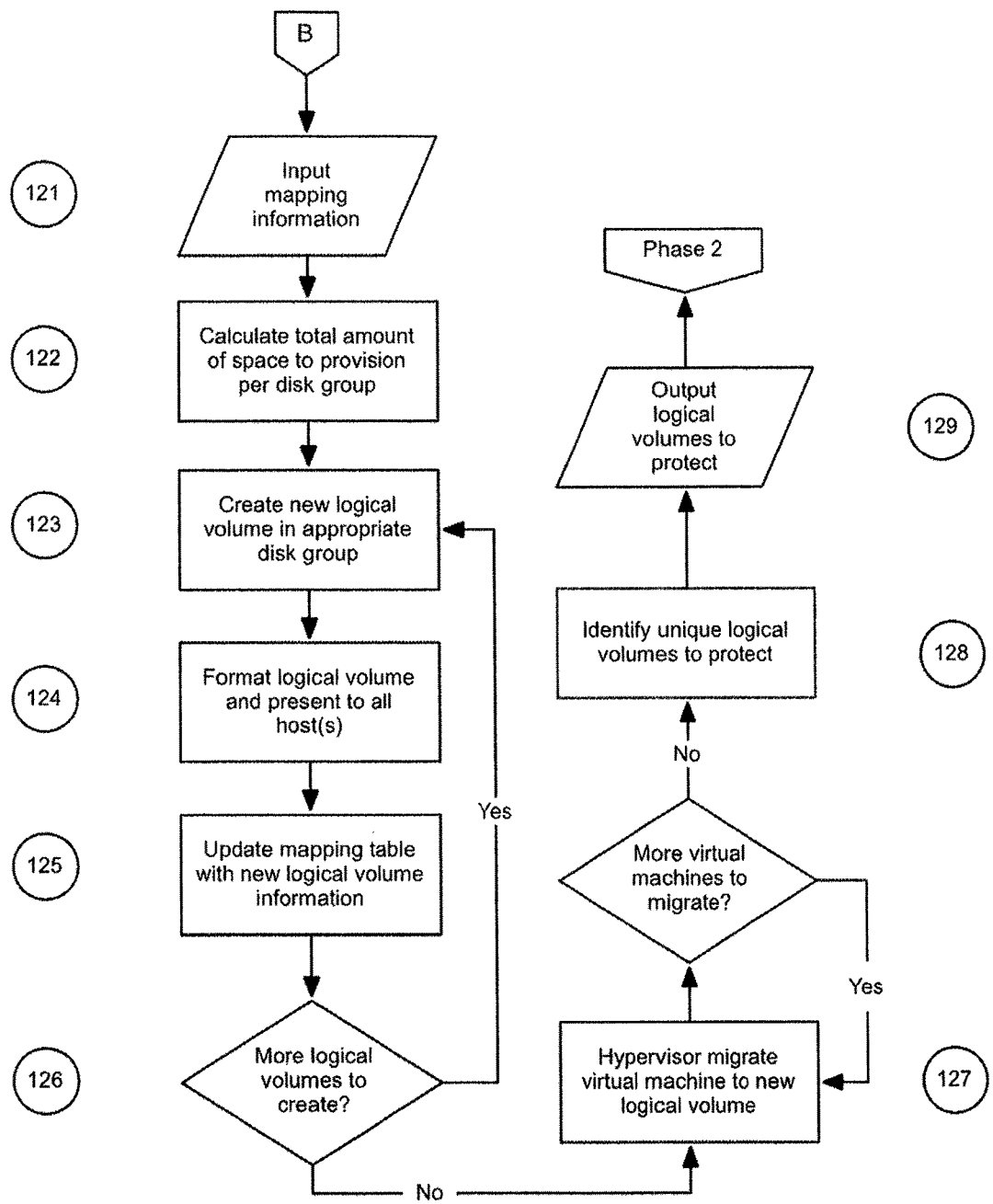

FIGS. 48 and 49 shows an example of a flow diagram illustrating a process for identifying logical volumes to protect based on the virtual machines identified in the process of FIG. 3 according to the second embodiment. In Step 112 of FIG. 48, the program reads the list of virtual machines that should be replicated. In Step 113, the program interrogates the hypervisor to determine a list of virtual volumes associated with each of the selected virtual machines from the VM replication list table of FIG. 4 and initializes the virtual machine and virtual volume columns in a VM to new logical volume table for the creation of a new replication buffer as shown in FIG. 50. In Step 114, the program identifies the logical volumes that contain the virtual volumes. In Step 115, the program identifies the disk group that contains the logical volumes. In Step 116, the program identifies the hosts associated with the virtual machine. In Step 117, the program fills in the logical volume, disk group, and host columns of the VM to new logical volume mapping table of FIG. 50. The program iterates over all the virtual volumes identified in Step 113. The program then iterates over all the virtual machines identified in Step 112. In Step 120, the program stores the mapping information in the VM to new logical volume mapping table in memory. The Embodiment 2 process now proceeds to FIG. 49.

In Step 121 of FIG. 49, the program starts with the information contained in the VM to new logical volume mapping table of FIG. 50. In Step 122, the program sums up the size of each of the logical volumes contained in each of the disk groups (DG01, DG02) that will result in the size of the logical volume needed to contain all of the data of all logical volumes in the selected virtual machines by disk group. The program will now create a single logical volume in each of the disk groups. The program will start with the first new logical volume that needs to be created and will create the new logical volume in Step 123. The new logical volume identifier is then used to populate the new logical volume column in the VM to new logical volume mapping table of FIG. 50. The program then formats the new logical volume in Step 124 and then presents the new logical volume to all the hosts identified by the unique list of hosts associated with the original set of logical volumes. In Step 126, the program iterates over all the new logical volumes that need to be created.

In Step 127, the program will start with the first virtual machine identified in the virtual machine column in the VM to new logical volume mapping table of FIG. 50 and uses the hypervisor to migrate the virtual machine to the new logical volume. The program then iterates over all the virtual machines contained in the VM to new logical volume mapping table of FIG. 50. In Step 128, the program reduces the duplicate logical volumes contained in the new logical volume column of FIG. 50, creating a logical volume replication list table for the creation of a new replication buffer according to the second embodiment as shown in FIG. 51, which is the output of Step 129. The process then proceeds to Phase 2 for the creation of a new replication buffer.

II.A.2 Modification of Existing Replication Buffer

The VM and physical volume identification process of Phase 1 for the creation of a new replication buffer starts with the same set of steps that identify the virtual machines to protect from Embodiment 1 found in FIG. 8. The process is performed by the VM and volume identification module (e.g., program). The output of FIG. 8 is the VM protection flag table of FIG. 9. The Embodiment 2 process now proceeds to FIG. 52.

Figure 52:
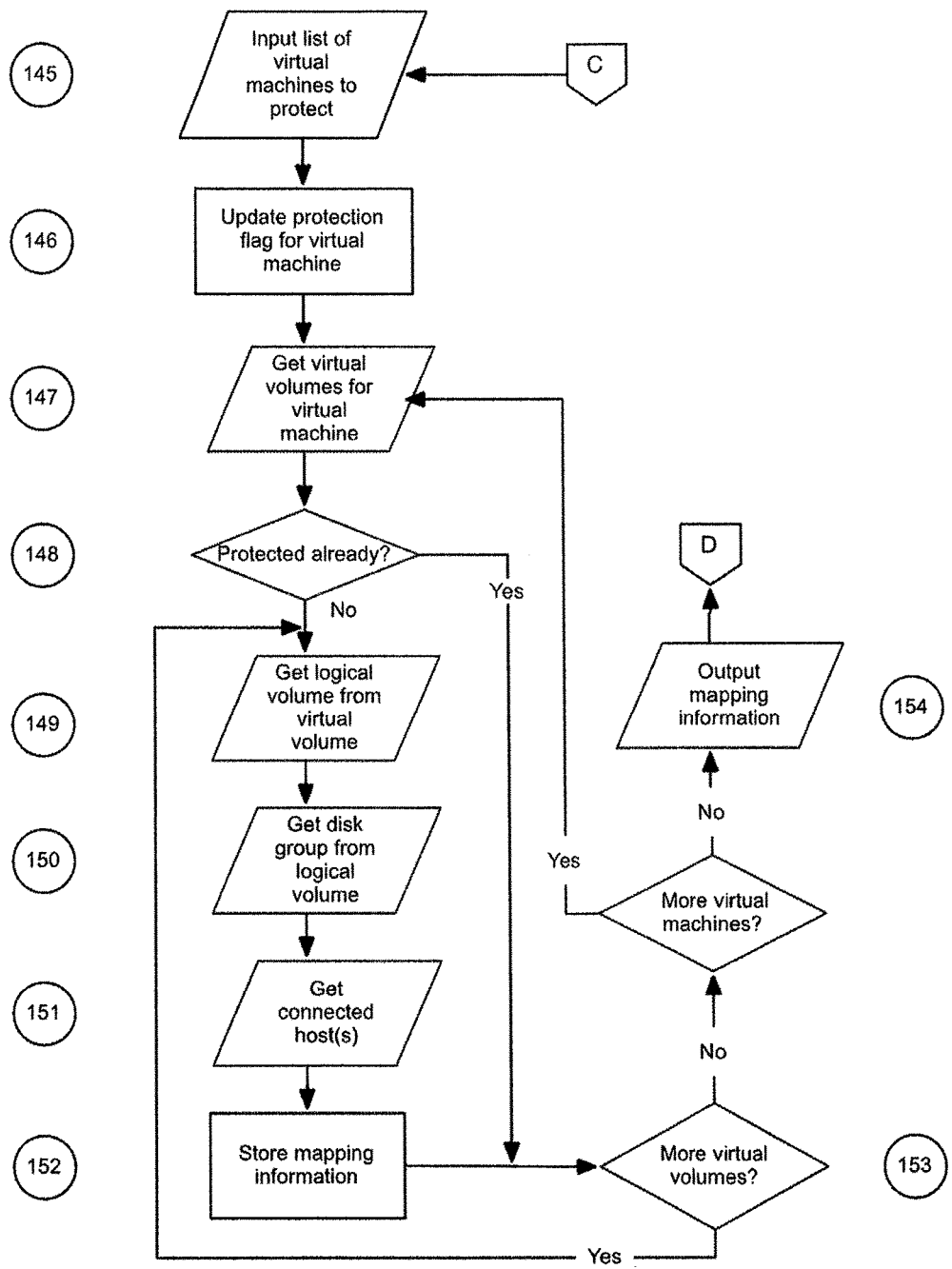
FIGS. 52-54 show an example of a flow diagram illustrating a process for identifying logical volumes to protect based on the virtual machines identified in the process of FIG. 8 according to the second embodiment.
Figure 53:
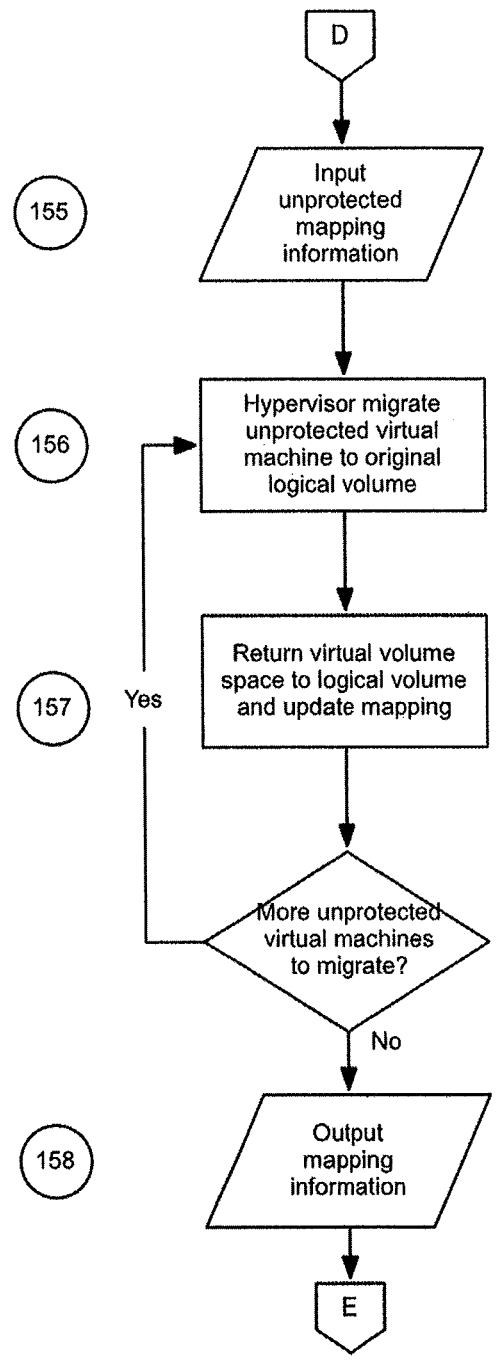
Figure 54:
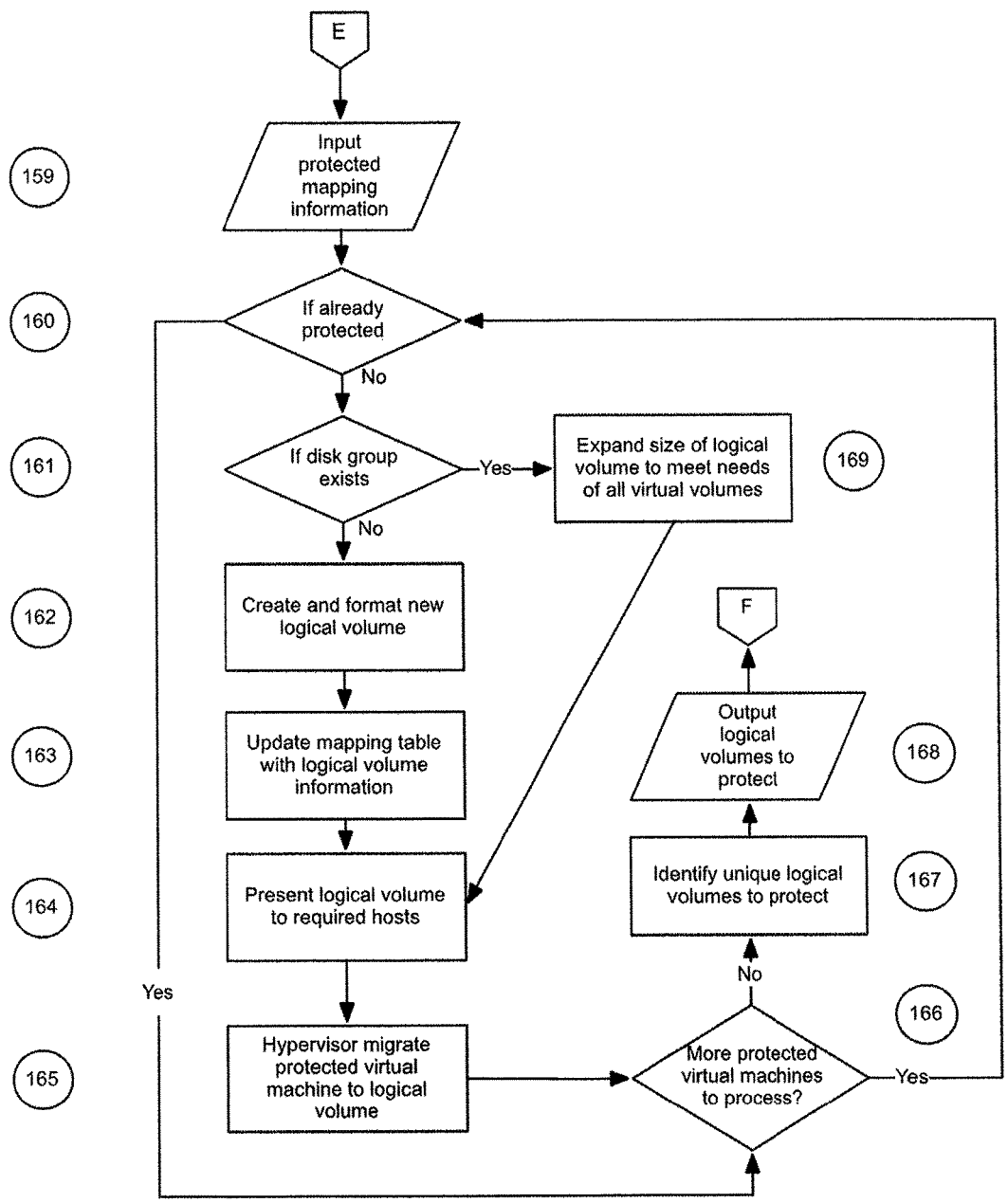

FIGS. 52-54 show an example of a flow diagram illustrating a process for identifying logical volumes to protect based on the virtual machines identified in the process of FIG. 8 according to the second embodiment. In Step 145 of FIG. 52, the program reads the list of virtual machines that should be protected from the VM protection flag table of FIG. 9. In Step 146, the program sets all values in the protect flag column to false in a VM to new logical volume mapping table for the modification of an existing replication buffer as shown in FIG. 21. The table of FIG. 21 was initialized from the stored mapping file created when the replication buffer was initially created in VM to new logical volume mapping table for the creation of a new replication buffer of FIG. 50. For each protected virtual machine read in Step 145, the program sets the protect flag column to true for the virtual machine.

In Step 147, the program will interrogate the hypervisor to determine a list of virtual volumes associated with each of the protected virtual machines from FIG. 21 and initializes the virtual machine and virtual volume columns in the VM to new logical volume mapping table of FIG. 21. The program iterates through all the virtual volumes belonging to virtual machines that should be protected. In Step 148, the program determines if the virtual volume has already been protected. If it has been protected, the program proceeds to Step 153. If it has not been protected, the program proceeds to Step 149.

In Step 149, the program identifies the logical volumes that contain the virtual volumes, while in Step 150, the program identifies the disk group that contains the logical volumes. In Step 151, the program identifies the hosts associated with the virtual machine. In Step 152, the program fills in the logical volume, disk group, and host columns of the VM to new logical volume mapping table of FIG. 21. The program iterates over all the virtual volumes obtained in Step 147. The program iterates over all the virtual machines obtained in Step 145. In Step 154, the program stores the mapping information contained in the VM to new logical volume mapping table of FIG. 21. The Embodiment 2 process now proceeds to FIG. 53.

In Step 155 of FIG. 53, the program gets the list of virtual machines that should not be protected by the replication buffer identified by a false value of the protect flag in the VM to new logical volume mapping table of FIG. 21. In Step 156, the program uses the hypervisor to migrate the virtual machine that needs to be unprotected from the new logical volume (2) to the original logical volume (1). In Step 157, the program returns the space consumed by the virtual machine used in (2) to the free pool and then updates the VM to new logical volume mapping table of FIG. 21 and clear the new logical volume entry for the virtual machine (3). The program then iterates over the remaining virtual machines that should be unprotected. In Step 158, the program updates the mapping information in the VM to new logical volume mapping table of FIG. 21 and proceeds to FIG. 54.

In Step 159 of FIG. 54, the program gets the list of virtual machines that should be protected by the replication buffer identified by a true value of the protect flag in the VM to new logical volume mapping table of FIG. 21. In Step 160, if the virtual machine is already protected, the program proceeds to Step 166. Otherwise, the program proceeds to Step 161.

In Step 161, if the disk group identified by the disk group column in the VM to new logical volume mapping table of FIG. 21 exists, the program proceeds to Step 169 where it expands the size of the new logical volume associated with the disk group to meet the needs of the new virtual machine. The program then proceeds to Step 164. If the disk group does not exist, the program proceeds to Step 162 where it creates and formats a new logical volume to contain the virtual machine virtual volume. In Step 163, the program updates the new logical volume column in the VM to new logical volume mapping table of FIG. 21 with the newly created logical volume.

In Step 164, the program determines if the new logical volume that was expanded in Step 169 or newly created in Step 162 needs to be presented to new hosts. If so, the program presents the new logical volume to the appropriate hosts. In Step 165, the program uses the hypervisor to migrate the virtual machine from the original logical volume (1) to the new logical volume (2). In Step 166, the program iterates over the remaining virtual machines. In Step 167, the program reduces the duplicate logical volumes contained in the new logical volume column of FIG. 21, creating a logical volume replication list table for the modification of an existing replication buffer according to the second embodiment as shown in FIG. 22, which is the output of Step 168. The process then proceeds to Phase 2 for the modification of an existing replication buffer.

II.B. Phase 2: Calculation

Phase 2 for the second embodiment is identical to that for the first embodiment.

II.C Phase 3: Replication Buffer Creation

Phase 3 for the second embodiment is identical to that of the first embodiment.

Figure 47:
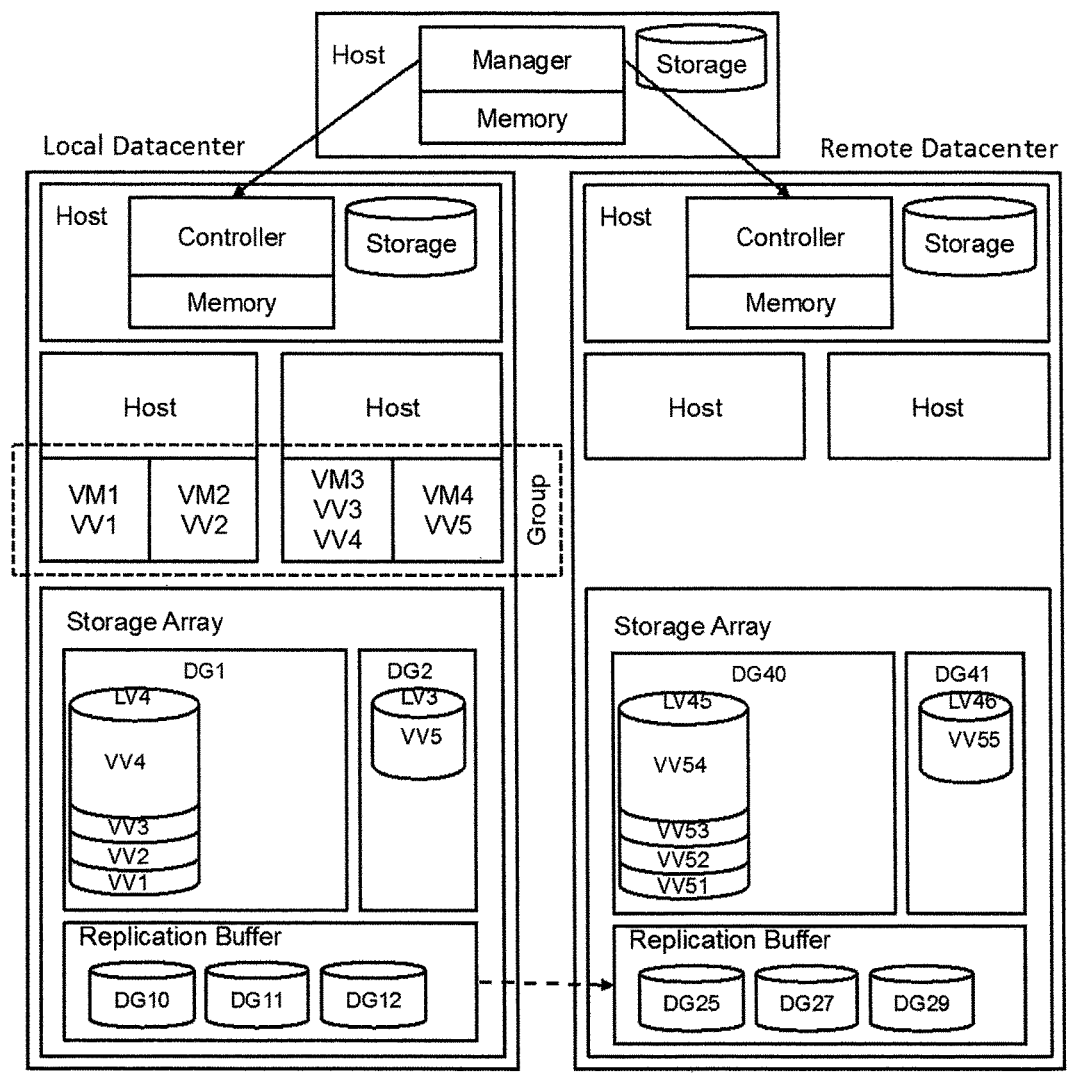
FIG. 47 illustrates an example of a hardware configuration of a system in which the method and apparatus of the invention may be applied according to the second embodiment.

Of course, the system configurations illustrated in FIGS. 1 and 47 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for efficient volume replication by automatically identifying workload and sizing replication buffers. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A computer comprising:
   a controller; and
   a memory connected to the controller and which stores instructions that, when executed by the controller, cause the controller to:
   identify one or more virtual machines of a plurality of virtual machines to be protected in a first storage system;
   identify one or more logical volumes of a plurality of logical volumes in the first storage system, the one or more logical volumes used by the identified one or more virtual machines, based on first relationship information between the plurality of virtual machines and the plurality of logical volumes, the first relationship information being managed by the controller;
   calculate a workload to be used for the identified one or more logical volumes, based on information of workload monitored for each of the identified one or more logical volumes, the information of workload monitored being managed by the controller; and
   calculate a size of a buffer area in the first storage system to be used for temporarily storing copy data to be sent from the first storage system to a secondstorage system in a remote copy procedure of one or more remote copy pairs, based on the calculated workload of the identified one or more logical volumes, each of the one or more remote copy pairs being formed by a logical volume of the identified one or more logical volumes in the first storage system as a primary logical volume and another logical volume in the second storage system as a secondary logical volume, so that the buffer area for the remote copy procedure of the identified one or more logical volumes having a size equal to or greater than the calculated size can be used to manage protection of the identified one or more virtual machines.

2. The computer according to claim 1, wherein the controller is further caused to (i) create a new buffer area in the first storage system based on the calculated workload and the calculated size of the buffer area or (ii) modify an existing buffer area in the first storage system based on the calculated workload and the calculated size of the buffer area.

3. The computer according to claim 1, wherein the controller is further caused to (i) create a new buffer area in the second storage system based on the calculated workload and the calculated size of the buffer area or (ii) modify an existing buffer area in the second storage system based on the calculated workload and the calculated size of the buffer area.

4. The computer according to claim 1,
wherein the first storage system has an overhead and an outage duration; and
wherein the size of the buffer area is calculated as the calculated workload multiplied by the outage duration multiplied by (1+overhead).

5. The computer according to claim 1,
wherein the first storage system has a plurality of disk groups including used disk groups and unused disk groups;
wherein each unused disk group has a disk group layout with a disk group size and a disk group throughput;
wherein the controller is further caused to select, from the unused disk groups, one or more disk groups to be used by the buffer area in the first storage system, and the selection of the one or more disk groups comprises:
organizing the unused disk groups by disk group layout;
identifying, for each disk group layout, a list of candidate disk groups which have a total disk group throughput that is greater than the calculated workload and which have a total disk group size that is greater than the calculated size of the buffer area, so as to produce one or more lists of candidate disk groups;
selecting, from the identified one or more lists of candidate disk groups, the list of candidate disk groups having the highest total disk group throughput; and
determining a number of disk groups required, in the selected list of candidate disk groups, for the buffer area by (i) dividing the calculated workload by the total disk group throughput for the selected list and rounding up to the nearest whole number to obtain a first calculated value, (ii) dividing the calculated size of the buffer area by the disk group size of the selected list and rounding up to the nearest whole number to obtain a second calculated value, and (iii) selecting a maximum of the first calculated value and the second calculated value as the number of disk groups required in the selected list of candidate disk groups for the buffer area.

6. The computer according to claim 1,
wherein the calculated size of the buffer area is for modifying an existing buffer area which has a list of existing one or more virtual machines to protect; and
wherein the controller is further caused to:
identify, from the list of existing one or more virtual machines, which of the existing one or more virtual machines will retain protection; and
identify any one or more virtual machines to be newly protected;
wherein the one or more logical volumes are identified which are used by the identified one or more virtual machines to retain protection and the identified one or more virtual machines to be newly protected.

7. The computer according to claim 1,
wherein the first storage system has a plurality of disk groups; and
wherein the calculated size of the buffer area is for selecting an existing buffer area which has a size that is greater than the calculated size of the buffer area and which has a total throughput that is greater than the calculated workload, the total throughput of the existing buffer area being equal to a product of a disk group throughput of one or more disk groups allocated to the existing buffer area and a number of the one or more disk groups allocated to the existing buffer area.

8. The computer according to claim 1,
wherein the first storage system has a plurality of disk groups including used disk groups and unused disk groups;
wherein the calculated size of the buffer area is for modifying an existing buffer area (i) which has a size that is not greater than the calculated size of thebuffer area or (ii) which has a total throughput that is not greater than the calculated workload, the total throughput of the existing buffer area being equal to a product of a disk group throughput of one or more existing disk groups allocated to the existing buffer area and a number of the one or more existing disk groups allocated to the existing buffer area; and
wherein the controller is further caused to select, from the unused disk groups, one or more disk groups to be added to the existing buffer area in the first storage system.

9. The computer according to claim 8,
wherein each unused disk group has a disk group layout with a disk group size and a disk group throughput;
wherein the one or more existing disk groups in the existing buffer area have an existing disk group layout; and
wherein the selection of the one or more disk groups to be added to the existing buffer area in the first storage system includes:
organizing the unused disk groups by disk group layout;
identifying, from the unused disk groups which have a same disk group layout as the existing disk group layout, a list of candidate disk groups which, when added to the existing disk groups, have a total disk group throughput that is greater than thecalculated workload and which have a total disk group size that is greater than the calculated size of the buffer area; and
determining a number of disk groups required, in the identified list of candidate disk groups, to be added to the existing buffer area by (i) dividing the calculated workload by the total disk group throughput for the identified list when added to the existing disk groups and rounding up to the nearest whole number to obtain a first calculated value, (ii) dividing the calculated size of the buffer area by the disk group size of the identified list when added to the existing disk groups and rounding up to the nearest whole number to obtain a second calculated value, and (iii) selecting a maximum of the first calculated value and the second calculated value as the number of disk groups required in the identified list of candidate disk groups to be added the existing buffer area.

10. The computer according to claim 1,
wherein the first storage system has a plurality of disk groups;
wherein a plurality of logical volumes are identified in the first storage system based on first relationship information; and
wherein the controller is further caused to:
identify disk groups that contain the identified logical volumes in the first storage system;
calculating a total amount of space to provision for each of the identified disk groups to contain all data of the identified logical volumes in the first storage system;
creating a single logical volume based on the calculated total amount of space to provision for each of the identified disk groups; and
calculating the workload and the size of the buffer area using the created single logical volume instead of the identified logical volumes.

11. The computer according to claim 10, wherein the controller is further caused to:
create a buffer area in the first storage system based on the calculated workload and the calculated size of the buffer area;
update the first relationship between the plurality of virtual machines and the plurality of logical volumes;
identify one or more new virtual machines of the plurality of virtual machines to be protected in the first storage system, the one or more new virtual machines being different from the previously identified one or more virtual machines to be protected;
identify a plurality of new logical volumes of the plurality of logical volumes in the first storage system, the one or more logical volumes used by the identified oneor more new virtual machines, based on the first relationship information between the plurality of virtual machines and the plurality of logical volumes;
identify disk groups that contain the identified new logical volumes in the first storage system;
calculate a total amount of new space to provision for each of the identified disk groups to contain all data of the identified new logical volumes in the first storage system;
create a new single logical volume based on the calculated total amount of new space to provision for each of the identified disk groups, by modifying the previously created single logical volume which includes removing any virtual machines that need to be unprotected and adding any virtual machines that need to be newly protected, based on the identified one or more new virtual machines to be protected;
calculate a new workload to be used for the new single logical volume, based on information of workload monitored for the new single logical volume;
calculate a new size of a new buffer area in the first storage system to be used for temporarily storing copy data to be sent from the first storage system to the second storage system in a remote copy procedure of one or more remote copy pairs, based on the calculated new workload of the new single logical volume, so that the new buffer area for the remote copy procedure of the new single logical volumehaving a size equal to or greater than the calculated new size can be used to manage protection of the identified one or more new virtual machines; and
modify the previously created buffer area to create the new buffer area based on the calculated new workload and the calculated new size of the new buffer area.

12. A system comprising:
a first storage system;
a second storage system; and
a management computer coupled to the first storage system and the second storage system, the management computer includes a memory connected to a controller, and the memory stores instructions that, when executed by the controller, causes the controller to:
identify one or more virtual machines of a plurality of virtual machines to be protected in the first storage system;
identify one or more logical volumes of a plurality of logical volumes in the first storage system, the one or more logical volumes used by the identified one or more virtual machines, based on first relationship information between the plurality of virtual machines and the plurality of logical volumes, the first relationship information being managed by the controller;

calculate a workload to be used for the identified one or more logical volumes, based on information of workload monitored for each of the identified one or morelogical volumes, the information of workload monitored being managed by the controller; and calculate a size of a buffer area in the first storage system to be used for temporarily storing copy data to be sent from the first storage system to the second storage system in a remote copy procedure of one or more remote copy pairs, based on the calculated workload of the identified one or more logical volumes, each of the one or more remote copy pairs being formed by a logical volume of the identified one or more logical volumes in the first storage system as a primary logical volume and another logical volume in the second storage system as a secondary logical volume, so that the buffer area for the remote copy procedure of the identified one or more logical volumes having a size equal to or greater than the calculated size can be used to manage protection of the identified one or more virtual machines.

13. A non-transitory computer-readable storage medium storing a plurality of instructions for controlling a data processor to manage replication, the plurality of instructions comprising:

instructions that cause the data processor to identify one or more virtual machines of a plurality of virtual machines to be protected in a first storage system;

instructions that cause the data processor to identify one or more logical volumes of a plurality of logical volumes in the first storage system, the one or more logical volumes used by the identified one or more virtual machines, based on first relationship information between the plurality of virtual machines and the plurality of logical volumes, the first relationship information being managed by the controller;

instructions that cause the data processor to calculate a workload to be used for the identified one or more logical volumes, based on information of workload monitored for each of the identified one or more logical volumes, the information of workload monitored being managed by the controller; and instructions that cause the data processor to calculate a size of a buffer area in the first storage system to be used for temporarily storing copy data to be sent from the first storage system to a second storage system in a remote copy procedure of one or more remote copy pairs, based on the calculated workload of the identified one or more logical volumes, each of the one or more remote copy pairs being formed by a logical volume of the identified one or more logical volumes in the first storage system as a primary logical volume and another logical volume in the second storage system as a secondary logical volume, so that the buffer area for the remote copy procedure of the identified one or more logical volumes having a size equal to or greater than the calculated size can be used to manage protection of the identified one or more virtual machines.

14. The non-transitory computer-readable storage medium of claim 13, wherein the plurality of instructions further comprise:

instructions that cause the data processor to (i) create a new buffer area in the second storage system based on the calculated workload and the calculated size of the buffer area or (ii) modify an existing buffer area in the second storage system based on the calculated workload and the calculated size of the buffer area.

15. The non-transitory computer-readable storage medium of claim 13, wherein the first storage system has a plurality of disk groups including used disk groups and unused disk groups;

wherein each unused disk group has a disk group layout with a disk group size and a disk group throughput;

wherein the plurality of instructions further comprise instructions that cause the data processor to select, from the unused disk groups, one or more disk groups to be used by the buffer area in the first storage system, the selecting one or more disk groups comprising:

organizing the unused disk groups by disk group layout;

identifying, for each disk group layout, a list of candidate disk groups which have a total disk group throughput that is greater than the calculated workload and which have a total disk group size that is greater than the calculated size of the buffer area, so as to produce one or more lists of candidate disk groups;

selecting, from the identified one or more lists of candidate disk groups, the list of candidate disk groups having the highest total disk group throughput; and determining a number of disk groups required, in the selected list of candidate disk groups, for the buffer area by (i) dividing the calculated workload by the total disk group throughput for the selected list and rounding up to the nearest whole number to obtain a first calculated value, (ii) dividing the calculated size of the buffer area by the disk group size of the selected list and rounding up to the nearest whole number to obtain a second calculated value, and (iii) selecting a maximum of the first calculated value and the second calculated value as the number of disk groups required in the selected list of candidate disk groups for the buffer area.

16. The non-transitory computer-readable storage medium of claim 13, wherein the calculated size of the buffer area is for modifying an existing buffer area which has a list of existing one or more virtual machines to protect; and wherein the plurality of instructions further comprise instructions that cause the data processor to:

identify, from the list of existing one or more virtual machines, which of the existing one or more virtual machines will retain protection; and identify any one or more virtual machines to be newly protected;

wherein the one or more logical volumes are identified which are used by the identified one or more virtual machines to retain protection and the identified one or more virtual machines to be newly protected.

17. The non-transitory computer-readable storage medium of claim 13, wherein the first storage system has a plurality of disk groups including used disk groups and unused disk groups;

wherein the calculated size of the buffer area is for modifying an existing buffer area (i) which has a size that is not greater than the calculated size of the buffer area or (ii) which has a total throughput that is not greater than the calculated workload, the total throughput of the existing buffer area being equal to a product ofa disk group throughput of one or more existing disk groups allocated to the existing buffer area and a number of the one or more existing disk groups allocated to the existing buffer area; and wherein the plurality of instructions further comprise instructions that cause the data processor to select, from the unused disk groups, one or more disk groups to be added to the existing buffer area in the first storage system.

18. The non-transitory computer-readable storage medium of claim 17, wherein each unused disk group has a disk group layout with a disk group size and a disk group throughput;

wherein the one or more existing disk groups in the existing buffer area have an existing disk group layout; and wherein the instructions that cause the data processor to select one or more disk groups to be added to the existing buffer area in the first storage system comprise:

instructions that cause the data processor to organize the unused disk groups by disk group layout;

instructions that cause the data processor to identify, from the unused disk groups which have a same disk group layout as the existing disk group layout, a list of candidate disk groups which, when added to the existing disk groups, have a totaldisk group throughput that is greater than the calculated workload and which have a total disk group size that is greater than the calculated size of the buffer area; and instructions that cause the data processor to determine a number of disk groups required, in the identified list of candidate disk groups, to be added to the existing buffer area by (i) dividing the calculated workload by the total disk group throughput for the identified list when added to the existing disk groups and rounding up to the nearest whole number to obtain a first calculated value, (ii) dividing the calculated size of the buffer area by the disk group size of the identified list when added to the existing disk groups and rounding up to the nearest whole number to obtain a second calculated value, and (iii) selecting a maximum of the first calculated value and the second calculated value as the number of disk groups required in the identified list of candidate disk groups to be added the existing buffer area.

19. The non-transitory computer-readable storage medium of claim 13, wherein the first storage system has a plurality of disk groups;

wherein a plurality of logical volumes are identified in the first storage system based on first relationship information; and wherein the plurality of instructions further comprise instructions that cause the data processor to:

identify disk groups that contain the identified logical volumes in the first storage system;

calculating a total amount of space to provision for each of the identified disk groups to contain all data of the identified logical volumes in the first storage system;

creating a single logical volume based on the calculated total amount of space to provision for each of the identified disk groups; and calculating the workload and the size of the buffer area using the created single logical volume instead of the identified logical volumes.

20. The non-transitory computer-readable storage medium of claim 19, wherein the plurality of instructions further comprise:

instructions that cause the data processor to create a buffer area in the first storage system based on the calculated workload and the calculated size of the buffer area;

instructions that cause the data processor to update the first relationship between the plurality of virtual machines and the plurality of logical volumes;

instructions that cause the data processor to identify one or more new virtual machines of the plurality of virtual machines to be protected in the first storage system, the one or more new virtual machines being different from the previously identified one or more virtual machines to be protected;

instructions that cause the data processor to identify a plurality of new logical volumes of the plurality of logical volumes in the first storage system, the one or more logical volumes used by the identified one or more new virtual machines, based on the first relationship information between the plurality of virtual machines and the plurality of logical volumes;

instructions that cause the data processor to identify disk groups that contain the identified new logical volumes in the first storage system;

instructions that cause the data processor to calculate a total amount of new space to provision for each of the identified disk groups to contain all data of the identified new logical volumes in the first storage system;

instructions that cause the data processor to create a new single logical volume based on the calculated total amount of new space to provision for each of the identified disk groups, by modifying the previously created single logical volume which includes removing any virtual machines that need to be unprotected and adding any virtual machines that need to be newly protected, based on the identified one or more new virtual machines to be protected;

instructions that cause the data processor to calculate a new workload to be used for the new single logical volume, based on information of workload monitored for the new single logical volume;

instructions that cause the data processor to calculate a new size of a new buffer area in the first storage system to be used for temporarily storing copy data tobe sent from the first storage system to the second storage system in a remote copy procedure of one or more remote copy pairs, based on the calculated new workload of the new single logical volume, so that the new buffer area for the remote copy procedure of the new single logical volume having a size equal to or greater than the calculated new size can be used to manage protection of the identified one or more new virtual machines; and instructions that cause the data processor to modify the previously created buffer area to create the new buffer area based on the calculated new workload and the calculated new size of the new buffer area.

* * * * *